(12) United States Patent
Jones et al.

(10) Patent No.: US 12,006,043 B2
(45) Date of Patent: Jun. 11, 2024

(54) AIRCRAFT ENVIRONMENTAL CONTROL SYSTEMS INCLUDING AIRFLOW INTERLEAVERS AND METHODS FOR CONTROLLING AIRFLOW WITHIN AIRCRAFT

(71) Applicant: The Boeing Company, Chicago, IL (US)

(72) Inventors: Nicholas A. Jones, Lynnwood, WA (US); William C. Haas, Seattle, WA (US)

(73) Assignee: The Boeing Company, Arlington, VA (US)

( * ) Notice: Subject to any disclaimer, the term of this patent is extended or adjusted under 35 U.S.C. 154(b) by 189 days.

(21) Appl. No.: 17/508,824

(22) Filed: Oct. 22, 2021

(65) Prior Publication Data
US 2022/0177142 A1   Jun. 9, 2022

Related U.S. Application Data

(60) Provisional application No. 63/121,204, filed on Dec. 3, 2020.

(51) Int. Cl.
*B64D 13/06* (2006.01)

(52) U.S. Cl.
CPC ........ *B64D 13/06* (2013.01); *B64D 2013/064* (2013.01); *B64D 2013/0655* (2013.01); *B64D 2013/0688* (2013.01)

(58) Field of Classification Search
CPC .............. B64D 13/06; B64D 2013/064; B64D 2013/0655; B64D 2013/0688; B64D 2013/0603; B64D 2013/0625; F24F 13/04
See application file for complete search history.

(56) References Cited

U.S. PATENT DOCUMENTS

| | | |
|---|---|---|
| 2,820,406 A | 1/1958 | Argentieri |
| 3,058,491 A | 10/1962 | Myhre |

(Continued)

FOREIGN PATENT DOCUMENTS

| | | |
|---|---|---|
| CA | 3085629 A1 | 6/2019 |
| DE | 19758275 A1 | 7/1998 |

(Continued)

OTHER PUBLICATIONS

Salikuddin et al., Acoustic and Laser Doppler Anemometer Results for Confluent and 12-Lobed $E^3$ Mixer Exhaust Systems for Subsonic Jet Noise Reduction, National Aeronautics and Space Administration Glenn Research Center, NASA/CR-2002-211597, Sep. 2002. (broken into multiple parts).

(Continued)

*Primary Examiner* — Edelmira Bosques
*Assistant Examiner* — Michael James Giordano
(74) *Attorney, Agent, or Firm* — Kolitch Romano Dascenzo Gates LLC

(57) ABSTRACT

Environmental control systems, airflow interleavers, and methods. The environmental control systems include an airflow interleaver and mix manifold comprising a mixing chamber. The airflow interleaver comprises a first airflow guide structure configured to guide a second airflow towards a central axis of the mixing chamber and a second airflow guide structure configured to guide a first airflow away from the central axis. The methods include channeling first and second airflows to the mix manifold, mixing the first and second airflows, which includes guiding the first airflow away from the central axis and guiding the second airflow towards the central axis. The airflow interleavers include a tubular body, and a plurality of converging airflow guides and a plurality of diverging airflow guides extending from the tubular body and collectively being configured to inter- (Continued)

leave first airflow streams flowing from the tubular body with second airflow streams flowing external to the tubular body.

20 Claims, 11 Drawing Sheets

(56) References Cited

U.S. PATENT DOCUMENTS

| | | | |
|---|---|---|---|
| 3,059,564 | A | 10/1962 | Curran et al. |
| 3,687,054 | A | 8/1972 | Boberg |
| 3,768,394 | A | 10/1973 | Powlesland |
| 4,102,357 | A | 7/1978 | Charlton |
| 4,896,588 | A | 1/1990 | Monda et al. |
| 4,971,768 | A | 11/1990 | Ealba et al. |
| 5,133,194 | A | 7/1992 | Army, Jr. et al. |
| 5,209,259 | A | 5/1993 | Dear et al. |
| 5,634,964 | A * | 6/1997 | Army, Jr. ............ F24F 13/04 55/463 |
| 5,807,171 | A | 9/1998 | Felsen |
| 5,929,396 | A | 7/1999 | Awad |
| 6,024,639 | A | 2/2000 | Scherer et al. |
| 6,413,159 | B1 | 7/2002 | Bates, III et al. |
| 6,920,959 | B2 | 7/2005 | Han et al. |
| 7,100,356 | B2 | 9/2006 | Han et al. |
| 7,409,985 | B2 | 8/2008 | Biasiotto et al. |
| 7,802,651 | B2 | 9/2010 | Park et al. |
| 8,118,648 | B2 | 2/2012 | Brüggen et al. |
| 8,616,944 | B2 | 12/2013 | Chambo et al. |
| 9,067,678 | B2 | 6/2015 | Edom et al. |
| 9,243,735 | B2 | 1/2016 | Holmgren |
| 9,581,163 | B2 | 2/2017 | Rivera et al. |
| 9,783,309 | B2 | 10/2017 | Vue et al. |
| 9,889,939 | B2 | 2/2018 | Zhang et al. |
| 9,995,245 | B2 * | 6/2018 | Dindar ............ F02K 1/386 |
| 10,081,429 | B2 | 9/2018 | Trudeau |
| 10,197,010 | B2 | 2/2019 | Forsyth |
| 10,220,955 | B2 | 3/2019 | Gregory et al. |
| 2007/0157803 | A1 | 7/2007 | McNeil et al. |
| 2009/0239463 | A1 | 9/2009 | Goenka |
| 2010/0154468 | A1 | 6/2010 | Shaska et al. |
| 2012/0118408 | A1 | 5/2012 | Holmgren |
| 2015/0021006 | A1 | 1/2015 | Vue et al. |
| 2015/0063995 | A1 | 3/2015 | Rivera et al. |
| 2016/0194086 | A1 | 7/2016 | Trudeau |
| 2022/0073207 | A1 | 3/2022 | Pattee et al. |

FOREIGN PATENT DOCUMENTS

| | | |
|---|---|---|
| DE | 102007019539 A1 | 10/2008 |
| EP | 0292033 A2 | 11/1988 |
| EP | 2851298 A1 | 3/2015 |
| GB | 893999 | 4/1962 |
| JP | 62-228831 | 7/1987 |
| JP | 409122428 A | 5/1997 |
| JP | 2020099580 A | 7/2020 |
| RO | 130182 A2 | 4/2015 |
| WO | WO1996/025329 A1 | 8/1996 |
| WO | WO1997/004877 A1 | 2/1997 |
| WO | WO1999/005459 A2 | 2/1999 |
| WO | WO2005/030582 A1 | 4/2005 |
| WO | WO2007/147259 A1 | 12/2007 |

OTHER PUBLICATIONS

Salikuddin et al., Acoustic and Laser Doppler Anemometer Results for Confluent, 22-Lobed and Unique-Lobed Mixer Exhaust Systems for Subsonic Jet Noise Reduction, National Aeronautics and Space Administration Glenn Research Center, NASA/CR-2002-211598, Sep. 2002. (broken into multiple parts).

Machine-generated English language translation for JP 409122428 A, May 13, 1997.

European Patent Office, Extended European Search Report for related European patent application EP21201346.0, Mar. 7, 2022.

Machine generated English language translation of German Patent Application Publication No. DE19758275A1, published Jul. 23, 1998.

Machine generated English language translation of German Patent Application Publication No. DE102007019539A1, published Oct. 30, 2008.

Machine generated English language translation of abstract of Japan Patent Application Publication No. JP62-228831, published Jul. 10, 1987.

Machine generated English language translation of Japan Patent Application Publication No. JP2020099580A, published Jul. 2, 2020.

Machine generated English language translation of Romania Patent Application Publication No. RO130182A2, published Apr. 30, 2015.

Low-Swirl Burner, Turbulent Premixed Combustion Research at Berkeley Lab Center for Computational Sciences and Engineering, downloaded from http://ccse.lbl.gov/Research/Combustion/lowSwirl.html on Jul. 14, 2014.

* cited by examiner

AIRCRAFT ENVIRONMENTAL CONTROL SYSTEMS INCLUDING AIRFLOW INTERLEAVERS AND METHODS FOR CONTROLLING AIRFLOW WITHIN AIRCRAFT

RELATED APPLICATION

The present application is a non-provisional of and claims priority to U.S. Provisional Patent Application No. 63/121,204, filed on Dec. 3, 2020, entitled "AIRCRAFT ENVIRONMENTAL CONTROL SYSTEMS INCLUDING AIRFLOW INTERLEAVERS AND METHODS FOR CONTROLLING AIRFLOW WITHIN AIRCRAFT," the complete disclosure of which is incorporated by reference.

FIELD

The present disclosure relates to aircraft environmental control systems and methods of controlling temperature in within aircraft.

BACKGROUND

Aircraft typically include an environmental control system for regulating various airflows within the aircraft. More specifically, the environmental control system often is responsible for controlling temperature within the cabin of the aircraft and does so, at least in part, by pulling warm cabin-drawn air from the cabin, mixing the warm cabin-drawn air with cool conditioned air received from one or more air cycle machines, and cycling the mixture of warm cabin-drawn air and cool conditioned air back to the cabin. In traditional environmental control systems, the warm cabin-drawn air and the cool conditioned air are mixed within a mix manifold that utilizes induced spin and turbulence to mix the warm cabin-drawn air and the cool conditioned air with one another. In most aircraft, the size of the mix manifold is constrained by any number of spatial restrictions, such as the height of the cargo area in commercial aircraft. Due to this size constraint and the large volume required to adequately mix the warm cabin-drawn air with the cool conditioned air utilizing induced spin and turbulence, traditional mix manifolds tend to be inefficient at mixing the warm cabin-drawn air with the cool conditioned air. In particular, in traditional environmental control systems, the warm cabin-drawn air and cool conditioned air may not be completely mixed with one another before being supplied to the cabin, which can result in a significant temperature variation in the airflow that is supplied to the cabin. Thus, a need exists for improved environmental control systems, mix manifolds, and methods and devices for mixing airflow within aircraft.

SUMMARY

Environmental control systems, airflow interleavers, and methods of regulating airflow within an aircraft are disclosed herein. The environmental control systems include a mix manifold including a mixing chamber configured to receive a first airflow and a second airflow and defining a central axis that extends through the mixing chamber. The environmental control systems also include an airflow interleaver disposed within the mixing chamber and including a first airflow guide structure configured to guide the second airflow towards the central axis and a second airflow guide structure configured to guide the first airflow away from the central axis to facilitate mixing of the first airflow and the second airflow to produce a mixed airflow therefrom.

The airflow interleavers include a tubular body having an interleaver axis that extends positively in a downstream direction, a plurality of converging airflow guides that extend from the tubular body radially towards the interleaver axis, and a plurality of diverging airflow guides that extend radially away from the central axis. The plurality of converging airflow guides are azimuthally interleaved with the plurality of diverging airflow guides. The plurality of converging airflow guides and the plurality of diverging airflow guides collectively are configured to interleave a plurality of first airflow streams flowing from the tubular body in the downstream direction with a plurality of second airflow streams flowing from a region external to the tubular body in the downstream direction to produce a mixed airflow therefrom.

The methods include channeling a first airflow from a cabin of an aircraft to a mix manifold, channeling a second airflow from an air cycle machine to the mix manifold, and mixing, with an airflow interleaver positioned within a mixing chamber of the mix manifold, the first airflow with the second airflow to produce a mixed airflow. The mixing includes guiding, with the airflow interleaver the first airflow away from a central axis of the mixing chamber, and guiding, with the airflow interleaver, the second airflow towards the central axis of the mixing chamber.

DESCRIPTION

Figure 1:
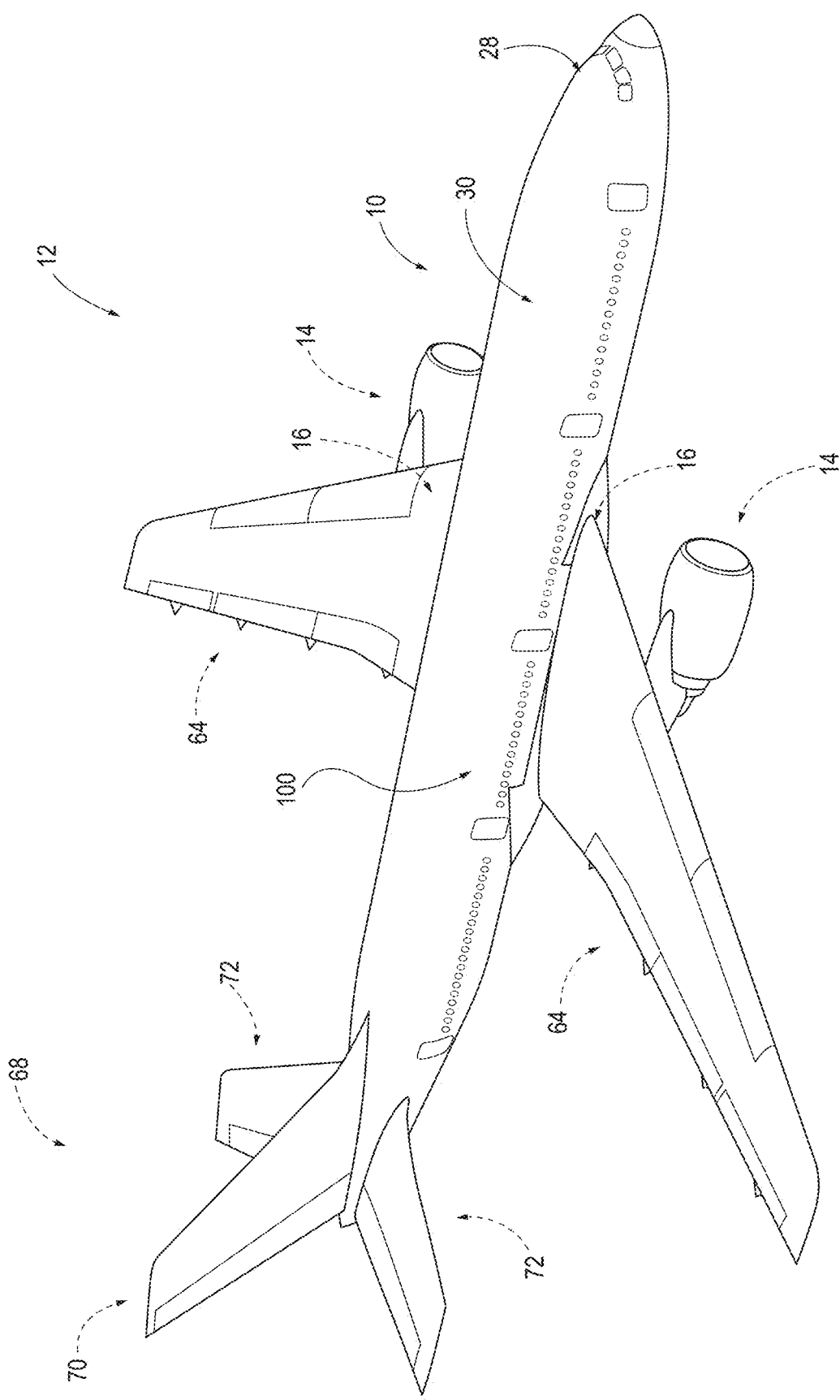
FIG. 1 represents examples of aircraft that include environmental control systems according to the present disclosure.

FIGS. 1-11 provide examples of environmental control systems 100, mix manifolds 200, airflow interleavers 300, and aircraft 12 that include and/or utilize environmental control systems 100, and/or methods 500 according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Additionally, dot-dashed lines may be utilized to indicate axes and/or dimensions of various components. Electrical and/or information communication connections may be indicated in dotted lines.

FIG. 1 is an illustration of examples of an aircraft 12 that include and/or utilize environmental control systems 100 according to the present disclosure. Examples of environmental control systems 100 and components thereof are illustrated FIGS. 2-10 and discussed in more detail herein with reference thereto.

Aircraft 12 includes a fuselage 10 and optionally includes at least one wing 64 operatively coupled to and/or extending from fuselage 10. Fuselage 10 defines and/or includes a cabin 30 configured to accommodate cargo and/or one or more passengers and/or a flight compartment 28 configured to accommodate at least one pilot. In some examples, flight compartment 28 and cabin 30 are separated from one another, such as by at least one door. Aircraft 12 also includes at least one engine assembly 14 that is operatively coupled to fuselage 10, such as via a corresponding wing 64. In some examples, aircraft 12 further includes a tail assembly 68 that is operably attached to and/or at least partially defined by fuselage 10. In some such examples, tail assembly 68 includes at least one vertical stabilizer 70 and/or at least one horizontal stabilizer 72. In some examples, aircraft 12 includes at least one air cycle machine 16 that is configured to produce conditioned airflow from bleed airflow received from at least one engine assembly 14, as described in more detail herein.

Aircraft 12 further includes and/or utilizes an environmental control system 100 that is configured to regulate airflow within aircraft 12. In some examples, environmental control system 100 is configured to regulate airflow to within and/or from within cabin 30 and/or to regulate airflow to within and/or from within flight compartment 28. In some examples, environmental control system 100 is configured to regulate a temperature of cabin 30 and/or a temperature of flight compartment 28. In some examples, environmental control system 100 is configured to receive the conditioned airflow from air cycle machine(s) 16, receive bleed airflow from engine assemblies 14, and/or draw airflow from cabin 30.

Aircraft 12 includes any suitable type of aircraft, with examples including a private aircraft, a commercial aircraft, a passenger aircraft, a cargo aircraft, a military aircraft, an autonomous aircraft, a wide-body aircraft, and/or a narrow body aircraft. While FIG. 1 illustrates examples in which aircraft 12 is a fixed wing aircraft, this is not required, and environmental control systems 100 according to the present disclosure may be included in and/or utilized with any of a variety of types of aircraft 12. Additional examples of aircraft 12 that may include and/or utilize subject matter according to the present disclosure include rotorcraft, helicopters, tiltwing aircraft, tiltrotor aircraft, rockets, rocket propulsion systems, and/or spacecraft.

Figure 2:
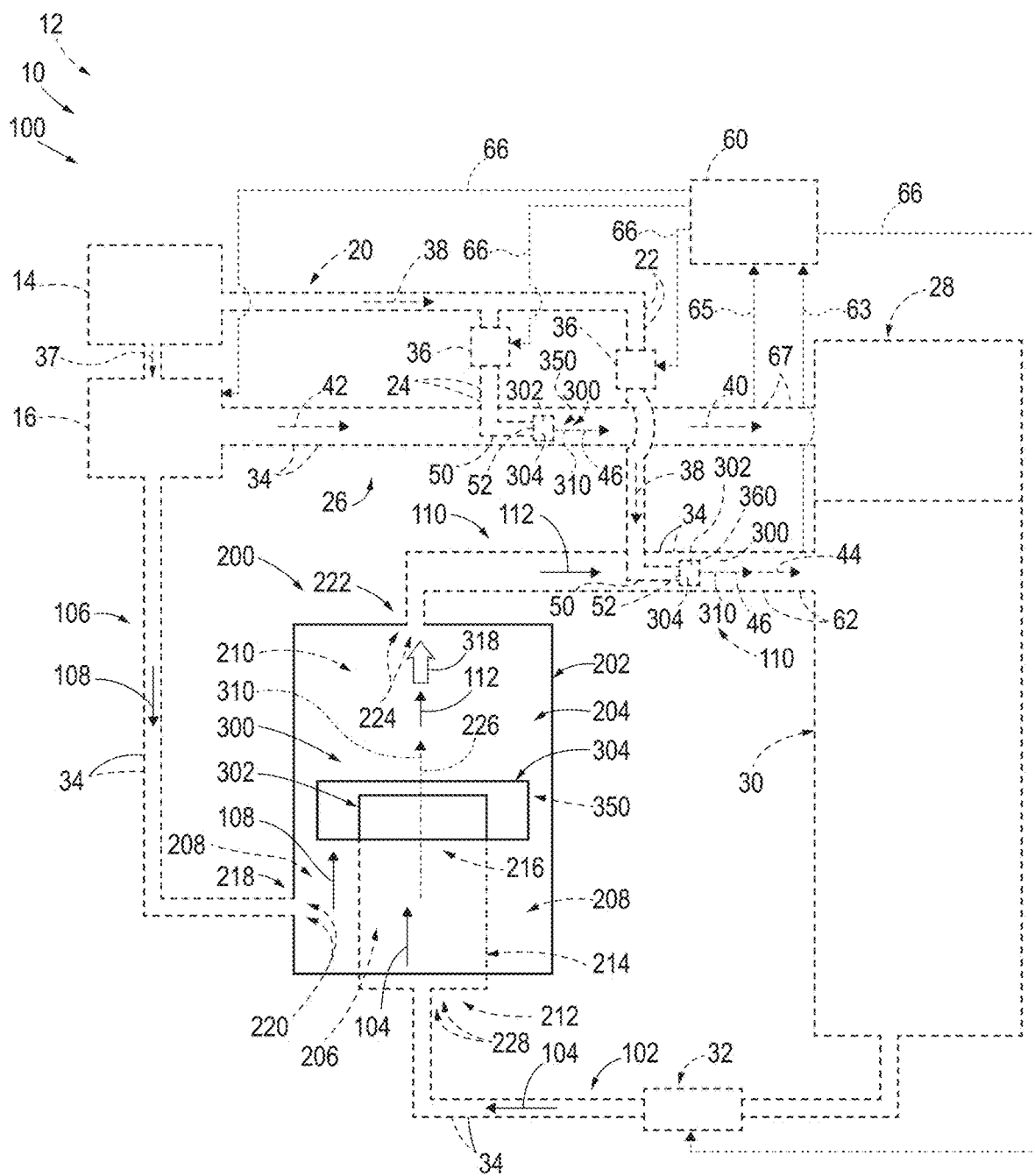
FIG. 2 is a schematic representation of examples of environmental control systems according to the present disclosure.

FIG. 2 is a schematic representation showing examples of environmental control systems 100 for regulating airflow within aircraft 12 according to the present disclosure. As shown in FIG. 2, environmental control systems 100 include a mix manifold 200 that is configured to receive a first airflow 104 and a second airflow 108 and produce a mixed airflow 112 from first airflow 104 and second airflow 108. Mix manifold 200 includes a mixing chamber 202 defining a central axis 226 that extends through mixing chamber 202. Environmental control systems 100 also include an airflow interleaver 300 disposed within the mixing chamber 202. Airflow interleaver 300 includes a first airflow guide structure 302 configured to guide second airflow 108 towards central axis 226 and a second airflow guide structure 304 configured to guide first airflow 104 away from central axis 226 to facilitate mixing of first airflow 104 and second airflow 108 and produce mixed airflow 112 therefrom.

In some examples, airflow interleaver 300 is positioned and/or oriented within mixing chamber 202 such that first airflow guide structure 302 extends at least partially around, and/or surrounds, central axis 226. In particular, as discussed in more detail herein, in some examples, airflow interleaver 300 extends around and defines an interleaver axis 310. In some examples, airflow interleaver 300 is positioned and/or oriented within mixing chamber 202 such that interleaver axis 310 is aligned with central axis 226, at least substantially parallel to central axis 226, and/or collinear with central axis 226.

In some examples, and as schematically illustrated in FIG. 2, mixing chamber 202 defines a mixing chamber internal volume 204 that includes a first zone 206 for receiving first airflow 104, a second zone 208 for receiving second airflow 108, and a third zone 210 in which mixed airflow 112 is produced. As shown in FIG. 2, mix manifold 200 may be described as guiding first airflow 104, second airflow 108, and mixed airflow 112 in a downstream direction 318 through mixing chamber internal volume 204, such that third zone 210 is downstream of, or in downstream direction 318 of, both of first zone 206 and second zone 208. In some examples, mix manifold 200 includes a first airflow supply conduit 214 that extends within mixing chamber 202 and that is configured to supply first airflow 104 to mixing chamber internal volume 204. When included, first airflow supply conduit 214 at least partially surrounds first zone 206 and at least partially separates first zone 206 from second zone 208. In such examples, first airflow supply conduit 214 also at least partially surrounds central axis 226, such that first zone 206 is positioned nearer to central axis 226 than second zone 208.

As schematically illustrated in FIG. 2, first airflow supply conduit 214 defines a first airflow inlet 216 within the within mixing chamber internal volume 204 that is configured to supply first airflow 104 to third zone 210. In some examples, airflow interleaver 300 includes at least a portion of airflow supply conduit 214 and defines first airflow inlet 216. In some such examples, and as schematically illustrated in FIG. 2, first airflow guide structure 302 is positioned directly downstream of first zone 206 and second airflow guide structure 304 is positioned directly downstream of second zone 208. As referred to herein, a first zone, region, or component that is positioned "directly downstream of" a second, zone region, or component is positioned directly adjacent to and in downstream direction 318 of the second component, zone, or region.

In some examples, airflow interleaver 300 is configured to partition first airflow 104 into a plurality of first airflow streams, to partition second airflow 108 into a plurality of second airflow streams, and to interleave the plurality of first airflow streams with the plurality of second airflow streams to produce mixed airflow 112 therefrom. In some such examples, first airflow guide structure 302 is configured to partition first airflow 104 into the plurality of first airflow streams and second airflow guide structure 304 is configured to partition second airflow 108 into the plurality of second airflow streams. First airflow guide structure 302 and second airflow guide structure 304 collectively are configured to interleave the plurality of first airflow streams with the plurality of second airflow streams to produce the mixed airflow 112 therefrom.

As shown in FIG. 2, in some examples, aircraft 12 includes at least one engine assembly 14 configured to produce a bleed airflow 37 and at least one air cycle machine 16 configured to receive bleed airflow 37 from engine assembly 14 and to condition bleed airflow 37 to produce a conditioned airflow 42 therefrom. Air cycle machine 16 additionally or alternatively may be referred to as a pneumatic air cycle kit (PACK) 16. Air cycle machine 16 is configured to cool or reduce a temperature of bleed airflow 37. In some examples, air cycle machine 16 is configured to pressurize, to increase a velocity of, and/or to dehumidify bleed airflow 37, to produce conditioned airflow 42. In the examples shown in FIG. 2, mix manifold 200 receives second airflow 108 from air cycle machine 16, such that second airflow 108 is or includes conditioned airflow 42. In some examples, and as shown in FIG. 2, mix manifold 200 receives first airflow 104 at least partially from cabin 30 of aircraft 12, such that first airflow 104 is or includes airflow drawn from cabin 30. In some other examples, mix manifold 200 receives second airflow 108 at least partially from cabin 30 and receives first airflow 104 from air cycle machine 16, such that first airflow 104 is or includes conditioned airflow 42, and such that second airflow 108 is or includes airflow drawn from cabin 30.

In some examples, aircraft 12 includes a plurality of engine assemblies 14 and a corresponding plurality of air cycle machines 16, with each air cycle machine 16 being configured to receive bleed airflow 37 from a corresponding engine assembly 14 and produce a corresponding conditioned airflow 42 therefrom. In some such examples, mix manifold 200 receives second airflow 108 from the plurality of air cycle machines 16. Stated differently, in such examples, each air cycle machine 16 is configured to produce a portion of second airflow 108, and the plurality of air cycle machines 16 collectively are configured to produce second airflow 108. In some examples, mix manifold 200 receives first airflow 104 from a plurality of spaced-apart outlets disposed along cabin 30, with each outlet being configured to draw airflow from a respective location of cabin 30. In such examples, first airflow 104 is supplied as a plurality of first airflow portions with each portion of first airflow 104 being supplied from a separate location of cabin 30 and the plurality of portions collectively forming first airflow 104.

In some examples, and as schematically illustrated in FIG. 2, environmental control system 100 is configured to channel mixed airflow 112 to cabin 30 of aircraft 12. In some such examples, environmental control system 100 is configured to channel mixed airflow 112 to each of a plurality of spaced-apart inlets disposed along cabin 30 with each inlet being configured to supply airflow to a respective particular location of cabin 30, such that mixed airflow 112 may be evenly supplied throughout cabin 30.

First airflow 104 and second airflow 108 are delivered to mix manifold 200 in any suitable manner. In some examples, and as schematically illustrated in FIG. 2, environmental control system 100 includes at least one circulation fan 32 that is configured to move first airflow 104 from cabin 30 to mix manifold 200. In some examples, such as in an example in which first airflow 104 is drawn from a plurality of outlets disposed along cabin 30, environmental control system 100 includes a plurality of circulation fans 32, such as may be configured to move first airflow 104 from the plurality of outlets. In some examples, air cycle machine(s) 16 is configured to pressurize and/or accelerate second airflow 108 such that air cycle machine(s) 16 forces second airflow 108 to mix manifold 200 at a high pressure and/or flow rate. In particular, when mix manifold 200 receives first airflow 104 from cabin 30 and receives second airflow 108 from air cycle machine 16, second airflow 108 typically is received by mix manifold 200 at a higher pressure and/or flow rate than that of first airflow 104. Accordingly, in some examples, mix manifold 200 is configured to produce mixed airflow 112 from first airflow 104 and second airflow 108 having the same or different pressures as one another. Additionally or alternatively, in some examples, mix manifold 200 is configured to produce mixed airflow 112 from first airflow 104 and second airflow 108 having the same or different flow rates as one another.

In some examples, environmental control system 100 includes various airflow ducting to channel first airflow 104, second airflow 108, and/or mixed airflow 112 within aircraft 12. In particular, in some examples, and as schematically illustrated in FIG. 2, environmental control system 100 includes a first airflow ducting 102 configured to channel first airflow 104 to mix manifold 200, a second airflow ducting 106 configured to channel second airflow 108 to mix manifold 200, and/or a mixed airflow ducting 110 configured to channel mixed airflow 112 from mix manifold 200. In some examples in which mix manifold 200 receives first airflow 104 from cabin 30 and receives second airflow 108 from at least one air cycle machine 16 and in which mixed airflow 112 is supplied to cabin 30, first airflow ducting 102 and second airflow ducting 106 are in fluid communication with cabin 30 and mix manifold 200, and second airflow ducting 106 is in fluid communication with at least one air cycle machine 16 and mix manifold 200. In some other examples in which first airflow 104 is received from at least one air cycle machine 16 and second airflow 108 is received from cabin 30, first airflow ducting 102 is in fluid communication with mix manifold 200 and air cycle machine 16, and second airflow ducting 106 is in fluid communication with mix manifold 200 and cabin 30.

In some examples, and as schematically illustrated in FIG. 2, first airflow ducting 102, second airflow ducting 106, and/or mixed airflow ducting 110 each include at least one duct 34 and optionally a plurality of ducts 34, with each duct 34 being configured to channel at least a portion of the respective airflow. In some examples in which mix manifold 200 receives second airflow 108 from a plurality of air cycle machines 16, second airflow ducting 106 includes a plurality of ducts 34, each being in fluid communication with a respective air cycle machine 16 and configured to channel a respective portion of second airflow 108 from the respective air cycle machine 16 to mix manifold 200. Similarly, in some examples in which first airflow 104 is drawn from a plurality of spaced apart outlets in fluid communication with cabin 30, first airflow ducting 102 includes a plurality of ducts 34, each being configured to channel a respective portion of first airflow 104 from a respective outlet in cabin 30 to mix manifold 200. Likewise, in some examples in which mixed airflow 112 is supplied to a plurality of spaced apart inlets in fluid communication with cabin 30, mixed airflow ducting 110 includes a plurality of ducts 34, each being configured to supply a respective portion of mixed airflow 112 to cabin 30. As shown in FIG. 2, at least one, and optionally a plurality of, circulation fan(s) 32 may be in fluid communication with first airflow ducting 102 and configured to move first airflow 104 through first airflow ducting 102.

In some examples, and as schematically illustrated in FIG. 2, mix manifold 200 includes a first airflow intake 212 configured to receive first airflow 104 and to channel first airflow to mixing chamber 202, a second airflow intake 218 configured to receive and channel second airflow 108 to mixing chamber 202, and/or a mixed airflow output 222 configured to receive and channel mixed airflow 112 from mixing chamber 202. In some examples, first airflow intake 212 is configured to supply first airflow 104 to first zone 206 of mixing chamber internal volume 204, second airflow intake 218 is configured supply second airflow 108 to second zone 208 of mixing chamber internal volume 204, and/or mixed airflow output 222 is configured to receive mixed airflow 112 from third zone 210 of mixing chamber internal volume 204. In such examples, and as schematically illustrated in FIG. 2, second airflow intake 218 defines at least one, and optionally a plurality of, second airflow inlet(s) 220 in fluid communication with second zone 208 and configured to supply second airflow 108 to second zone 208. In some examples, mixed airflow output 222 includes at least one, and optionally a plurality of, mixed airflow outlet(s) 224 in fluid communication with third zone 210 and configured to receive mixed airflow 112 from third zone 210. When included, first airflow supply conduit 214 is included in and/or defines a portion of first airflow intake 212. In particular, first airflow intake 212 supplies first airflow 104 to first zone 206, which is at least partially surrounded by first airflow supply conduit 214, and first airflow supply conduit 214 channels first airflow 104 through first zone 206 to first airflow inlet 216.

In some examples, first airflow intake 212 is in fluid communication with first airflow ducting 102 and is configured to receive first airflow 104 from first airflow ducting 102. In such examples, and as schematically illustrated in FIG. 2, first airflow intake 212 includes at least one first airflow port 228, and optionally a plurality of first airflow ports 228, configured to supply first airflow 104 to first airflow supply conduit 214. In some examples, each first airflow port 228 is in fluid communication with a duct 34 of first airflow ducting 102. For some examples in which first airflow ducting 102 includes a plurality of ducts 34, first airflow intake 212 includes a plurality of corresponding first airflow ports 228, with each first airflow port 228 being configured to supply a respective portion of first airflow 104 from a duct 34 to first airflow supply conduit 214.

In some examples, second airflow intake 218 is in fluid communication with second airflow ducting 106 and is configured to receive second airflow 108 from second airflow ducting 106. In some such examples, each second airflow inlet 220 is in fluid communication with a corresponding duct 34 of second airflow ducting 106. For some examples in which second airflow ducting 106 includes a plurality of ducts 34, second airflow intake 218 includes a plurality of corresponding second airflow inlets 220, each being configured to supply a respective portion of second airflow 108 to mixing chamber 202. Likewise, in some examples, mixed airflow output 222 is in fluid communication with mixed airflow ducting 110 and is configured to supply mixed airflow 112 to mixed airflow ducting 110. In some such examples, each mixed airflow outlet 224 is in fluid communication with a duct 34 of mixed airflow ducting 110. For some examples in which mixed airflow ducting 110 includes a plurality of ducts 34, mixed airflow output 222 includes a plurality of corresponding mixed airflow outlets 224 with each mixed airflow output 222 being configured to supply a respective portion of mixed airflow 112 to the respective duct 34.

In some examples, first airflow 104 has a temperature that is different from a temperature of second airflow 108, such as when first airflow 104 and second airflow 108 are received by and/or enter mix manifold 200. In some examples, first airflow 104 has a temperature that is greater than a temperature of the second airflow 108. In some more specific examples, the temperature of first airflow 104 is greater than the temperature of second airflow 108 when mix manifold 200 receives first airflow 104 from cabin 30 and when mix manifold 200 receives second airflow 108 from air cycle machine(s) 16. In other words, in such examples, the temperature of airflow drawn from cabin 30 is greater than conditioned airflow 42 produced by air cycle machine(s) 16.

In some examples, mix manifold 200 produces mixed airflow 112 with a temperature that is less than the temperature of first airflow 104 and greater than the temperature of second airflow 108. Stated differently, in some examples, mix manifold 200 is configured to facilitate rapid thermal equilibration between first airflow 104 and second airflow 108 such that the temperature of mixed airflow 112 is less than the temperature of first airflow 104 and greater than the temperature of second airflow 108.

In some examples, the temperature of first airflow 104 is greater than the temperature of second airflow 108 by an airflow temperature differential, and mix manifold 200 is configured to produce mixed airflow 112 with a threshold maximum temperature variation in mixed airflow 112. Examples of the airflow temperature differential include at least 10 degrees Celsius (° C.), at least 15° C., at least 17.5° C., at least 20° C., at least 22.5° C., at least 25° C., at least 30° C., at least 40° C., at least 50° C., at most 25° C., at most 30° C., at most 40° C., at most 50° C., and/or at most 100° C. Examples of the threshold maximum temperature variation in the mixed airflow 112 include at least 0.01° C., at most 0.05° C., at most 0.1° C., at most 0.5° C., at most 1° C., at most 1.5° C., at most 2° C., at most 3° C., at most 4° C., and/or at most 5° C. As discussed herein, the threshold maximum temperature variation in mixed airflow 112 may include and/or be a maximum temporal variation in the temperature of mixed airflow 112, such as may be measured at a particular location of mix manifold 200 and/or mixed airflow ducting 110 over a particular interval of time. In more specific examples, a maximum temporal variation is measured at a particular instance of time at one or more mixed airflow outlets 224 and/or at a particular location of mixed airflow ducting 110, such as at a cabin airflow temperature sensor 62 discussed in more detail herein. Additionally or alternatively, the threshold maximum temperature variation may include and/or be a maximum spatial variation in the temperature of mixed airflow 112, which may be measured as a maximum temperature difference between two different locations of mix manifold 200 and/or mixed airflow ducting 110 at a particular instance in time. In more specific examples, a maximum spatial temperature difference in mixed airflow 112 is measured between any two mixed airflow outlets 224 and/or as measured between any two locations along mixed airflow ducting 110 at a particular instance of time. In some examples, mix manifold 200 is configured to produce mixed airflow 112 with a threshold maximum temperature variation that is at most a threshold fraction of the airflow temperature differential, with examples of the threshold fraction including at least 0.01%, at least 0.1%, at most 0.1%, at most 0.5%, at most 1%, at most 2%, at most 3%, at most 4%, at most 5%, at most 6%, and/or at most 10%.

As shown in FIG. 2, in some examples, environmental control systems 100 are configured to supply a cabin airflow 44 to cabin 30. As referred to herein, cabin airflow 44 includes the airflow that environmental control system 100 supplies to cabin 30. Thus, cabin airflow 44 includes mixed airflow 112 and optionally includes one or more additional airflows that are introduced to mixed airflow 112 downstream of mix manifold 200. More specifically, in some examples, environmental control systems 100 are configured to channel a trim airflow 38 into mixed airflow 112 downstream of mix manifold 200. As referred to herein, trim airflow 38 is received from an engine assembly 14, and may include hot, pressurized airflow that bypasses the respective air cycle machine 16. In some examples, cabin airflow 44 includes a mixture of mixed airflow 112 and trim airflow 38. As shown in FIG. 2, in some examples, environmental control systems 100 include a trim airflow ducting 20 that is in fluid communication with at least one engine assembly 14 and mixed airflow ducting 110, and that is configured to channel trim airflow 38 from engine assembly(s) 14 to mixed airflow ducting 110. As discussed in more detail herein, in some examples, a temperature of trim airflow 38 is greater than a temperature of mixed airflow 112, and trim airflow 38 is supplied to mixed airflow 112 to increase a temperature of cabin airflow 44.

As discussed herein with reference to first airflow ducting 102, second airflow ducting 106, and mixed airflow ducting 110, trim airflow ducting 20 includes at least one duct, and optionally a plurality of ducts that are configured to channel trim airflow 38. In some examples, aircraft 12 includes a plurality of engine assemblies 14, and trim airflow ducting 20 includes a plurality of ducts configured to channel trim airflow 38 from the plurality of engine assemblies 14. In the examples shown in FIG. 2, trim airflow ducting 20 includes a cabin trim airflow supply duct 22 that is configured to channel trim airflow 38 into mixed airflow ducting 110. In some examples, trim airflow ducting 20 includes a plurality of cabin trim airflow supply ducts 22 that are in fluid communication with a plurality of ducts 34 of mixed airflow ducting 110.

In some examples, and as schematically illustrated in FIG. 2, environmental control systems 100 are configured to supply a flight compartment airflow 40 to flight compartment 28 of aircraft 12. In some such examples, environmental control systems 100 are configured to receive trim airflow 38 from one or more engine assemblies 14, to receive conditioned airflow 42 from one or more air cycle machines 16, and to combine the trim airflow 38 with the conditioned airflow 42 to produce the flight compartment airflow 40. In some examples, and as schematically illustrated in FIG. 2, environmental control systems 100 include a flight compartment airflow ducting 26 that is in fluid communication with one or more air cycle machines 16 and configured to channel conditioned airflow 42 from air cycle machine(s) 16 to flight compartment 28. In some examples, trim airflow ducting 20 includes a flight compartment trim airflow supply duct 24 that is in fluid communication with flight compartment airflow ducting 26 and that is configured to channel trim airflow 38 into flight compartment airflow ducting 26, such as to produce flight compartment airflow 40 therefrom. As mentioned, the temperature of trim airflow 38 typically is greater than the temperature of conditioned airflow 42, and trim airflow 38 may be selectively added to conditioned airflow 42 to increase the temperature of flight compartment airflow 40. When included, flight compartment airflow ducting 26 includes at least one duct 34, and optionally a plurality of ducts 34, for receiving trim airflow 38 and conditioned airflow 42 and for channeling flight compartment airflow 40 to flight compartment 28. In some examples, trim airflow ducting 20 includes a plurality of flight compartment trim airflow supply ducts 24, and flight compartment airflow ducting 26 is in fluid communication with the plurality of flight compartment trim airflow supply ducts 24.

In some examples, environmental control systems 100 include a plurality of airflow interleavers 300, in which each airflow interleaver 300 may have the same or a different configuration as one or more other airflow interleavers 300. When environmental control system 100 includes a plurality of airflow interleavers 300, the airflow interleaver 300 positioned within mix manifold 200 is referred to herein as a mix manifold airflow interleaver 350. In some such examples, environmental control systems 100 further include at least one airflow interleaver 300 that is disposed within a duct 34 of mixed airflow ducting 110 and is referred to herein as a cabin airflow interleaver 360. In some examples, cabin airflow interleaver 360 is configured to facilitate mixing of mixed airflow 112 with trim airflow 38 to produce cabin airflow 44 therefrom. Cabin airflow interleaver 360 may facilitate mixing of trim airflow 38 with mixed airflow 112 in a similar, or an at least substantially similar, manner to that discussed herein by which mix manifold airflow interleaver 350 facilitates mixing of first airflow 104 and second airflow 108 to produce mixed airflow 112.

More specifically, as shown in FIG. 2, duct 34 of mixed airflow ducting 110 defines a ducting central axis 46 that extends centrally through duct 34. In some such examples, cabin airflow interleaver 360 is positioned within duct 34 of mixed airflow ducting 110 at an intersection with a cabin trim airflow supply duct 22 that is configured to supply trim airflow 38 to mixed airflow ducting 110. As discussed herein, cabin airflow interleaver 360 includes a first airflow guide structure 302 and a second airflow guide structure 304. In the case of cabin airflow interleaver 360, first airflow guide structure 302 is configured to guide mixed airflow 112 towards ducting central axis 46 and second airflow guide structure 304 is configured to guide trim airflow 38 away from ducting central axis 46. In some examples, cabin airflow interleaver 360 is positioned within duct 34 such that first airflow guide structure 302 surrounds ducting central axis 46 and/or such that interleaver axis 310 of cabin airflow interleaver 360 is aligned with, at least substantially parallel with, and/or at least substantially collinear with ducting central axis 46. In some examples, and as schematically illustrated in FIG. 2, cabin trim airflow supply duct 22 includes and/or terminates in a trim airflow supply conduit 50 that extends within duct 34 of mixed airflow ducting 110 and that includes a trim airflow inlet 52 that is configured to supply trim airflow 38 to duct 34. In such examples, cabin airflow interleaver 360 defines trim airflow inlet 52. In some examples, environmental control system 100 includes a plurality of cabin airflow interleavers 360, such as when trim airflow ducting 20 includes a plurality of cabin trim airflow supply ducts 22 that are configured to supply trim airflow 38 to a plurality of ducts 34 of mixed airflow ducting 110.

In some examples, one or more components of cabin airflow interleaver 360 are characterized by a spin-inducing conformation that is configured to induce spin and/or rotation in cabin airflow 44. More specifically, in some examples, mixed airflow 112 includes water vapor or suspended condensation, and cabin airflow interleaver 360 is configured induce a vortex or spin in cabin airflow 44 that forces the entrained water droplets to coalesce along the walls of duct 34 of mixed airflow ducting 110. In some such examples, mixed airflow ducting 110 includes one or more mechanisms for capturing the water droplets coalesced along duct 34, such as one or more drain valves and/or one or more scupper rings.

In some examples, and as schematically illustrated in FIG. 2, environmental control systems 100 further include at least one airflow interleaver 300 that is disposed within a duct 34 of flight compartment airflow ducting 26 and that is referred to herein as a flight compartment airflow interleaver 365. Flight compartment airflow interleaver 365 is configured to facilitate mixing of conditioned airflow 42 with trim airflow 38 to produce flight compartment airflow 40 therefrom. Flight compartment airflow interleaver 365 may facilitate mixing of trim airflow 38 with conditioned airflow 42 in a similar, or an at least substantially similar, manner to that discussed herein for mix manifold airflow interleaver 350 and/or cabin airflow interleaver 360.

As shown in FIG. 2, duct 34 of flight compartment airflow ducting 26 defines a ducting central axis 46 that extends centrally through duct 34. In some examples, flight compartment airflow interleaver 365 is positioned within duct 34 at an intersection with a flight compartment trim airflow supply duct 24 that is configured to supply trim airflow 38 to duct 34. Here, first airflow guide structure 302 of flight compartment airflow interleaver 365 is configured to guide conditioned airflow 42 towards ducting central axis 46 and second airflow guide structure 304 is configured to guide trim airflow 38 away from ducting central axis 46. Flight compartment airflow interleaver 365 may be positioned relative to ducting central axis 46 such that interleaver axis 310 of flight compartment airflow interleaver 365 is at least substantially aligned with and/or at least substantially collinear with ducting central axis 46. Similarly, in some examples, flight compartment trim airflow supply duct 24 includes a trim airflow supply conduit 50 that extends within duct 34 of flight compartment airflow ducting 26 and that includes a trim airflow inlet 52 that is configured to supply trim airflow 38 to duct 34. In some such examples, cabin airflow interleaver 360 defines trim airflow inlet 52. In some examples, environmental control system 100 includes a plurality of flight compartment airflow interleavers 365, such as when trim airflow ducting 20 includes a plurality of flight compartment trim airflow supply ducts 24 that are configured to supply trim airflow 38 to a plurality of ducts 34 of flight compartment airflow ducting 26.

With continued reference to FIG. 2, in some examples, environmental control systems 100 are configured to control a temperature within aircraft 12 by regulating one or more airflows. In some such examples, and as schematically illustrated in FIG. 2, environmental control system 100 includes a controller 60 that is configured to regulate various valves and/or actuators within environmental control system 100 and/or aircraft 12, such as based on signals received by controller 60 from various sensors in environmental control system 100 and/or aircraft 12. In particular, in some examples, environmental control systems 100 include at least one cabin airflow temperature sensor 62, and optionally a plurality of cabin airflow temperature sensors 62, configured to detect a temperature of cabin airflow 44 and to generate a cabin airflow temperature signal 63 that corresponds to the temperature of the cabin airflow 44. In some examples, cabin airflow temperature sensor 62 is disposed along mixed airflow ducting 110, such as downstream of cabin trim airflow supply duct 22, or between cabin trim airflow supply duct 22 and cabin 30. In such examples, controller 60 is configured to receive the cabin airflow temperature signals 63 from cabin airflow temperature sensor(s) 62 and at least partially control operation of environmental control system 100 to regulate the temperature of cabin airflow 44, at least in part, based on the cabin airflow temperature signals 63. Each cabin airflow temperature sensor 62 may include and/or be any of a variety of devices that are operable to generate the cabin airflow temperature signal, examples of which include a thermometer, a thermocouple, a thermistor, a contact temperature sensor, a non-contact temperature sensor, and/or an infrared temperature sensor.

In some examples, controller 60 is programmed to control a ratio of first airflow 104 to second airflow 108 that is supplied to mix manifold 200 to control the temperature of cabin airflow 44. The ratio of first airflow 104 to second airflow 108 may include a volumetric ratio, a flow rate ratio, and/or a mass ratio. In some such examples, such as in an example in which the temperature of first airflow 104 is greater than the temperature of second airflow 108, controller 60 is programmed to increase a relative proportion of first airflow 104 supplied to mix manifold 200 when the temperature of cabin airflow 44 is less than a threshold minimum temperature of a target cabin airflow temperature range. Similarly, in some examples, controller 60 is programmed to increase a relative proportion of second airflow 108 supplied to mix manifold 200 when the temperature of cabin airflow 44 is greater than a threshold maximum temperature of the target airflow temperature range. In more specific examples, controller 60 is programmed to increase an output power to circulation fan(s) 32 and/or decrease an output power to air cycle machine(s) 16 to increase the relative proportion of first airflow 104. Additionally or alternatively, controller 60 is programmed to decrease the output power to circulation fan(s) 32 and/or increase the output power of air cycle machine(s) 16 to increase the relative proportion of second airflow 108. Controller 60 also may be programmed to selectively actuate various valves associated with first airflow ducting 102 and/or second airflow ducting 106 to regulate the respective flow rates of first airflow 104 and second airflow 108 and to control the ratio of first airflow 104 to second airflow 108 that is supplied to mix manifold 200. In some examples, controller 60 is configured to send controller signals to circulation fan(s) 32 and/or air cycle machine(s) 16 to control the output power thereof.

In some examples, controller 60 is programmed to regulate a supply of trim airflow 38 into mixed airflow 112 to regulate the temperature of cabin airflow 44. In particular, in some examples, controller 60 is programmed to reduce a flow rate of trim airflow 38 into mixed airflow 112 when the temperature of cabin airflow 44 is greater than the threshold maximum temperature of the target cabin airflow temperature range and/or to increase the flow rate of trim airflow 38 into mixed airflow 112 when the temperature of cabin airflow 44 is less than the threshold minimum temperature of the target cabin airflow temperature range. As shown in FIG.

2, in some examples, environmental control systems 100 includes a trim airflow valve 36 configured to regulate the flow rate of trim airflow 38 through cabin trim airflow supply duct 22, and controller 60 is programmed to regulate trim airflow valve 36 to control the flow rate of trim airflow 38 into mixed airflow 112. In some such examples, controller 60 is configured to send control signals 66 to trim airflow valve 36 to regulate the flow rate of trim airflow valve 36 into mixed airflow 112.

In some examples, environmental control systems 100 are configured to regulate a temperature of flight compartment airflow 40. In some such examples, controller 60 is in communication with one or more flight compartment temperature sensors 67 configured to generate respective flight compartment temperature signals 65 corresponding to the temperature of flight compartment airflow 40, and controller 60 is programmed to regulate a ratio of trim airflow 38 and conditioned airflow 42 in flight compartment airflow 40 based on the flight compartment temperature signals 65. In some examples, controller 60 is configured to increase a relative proportion of trim airflow 38 in flight compartment airflow 40 when flight compartment airflow 40 is less than a threshold minimum temperature of a target flight compartment temperature range and/or to decrease the relative proportion of trim airflow 38 in flight compartment airflow 40 when the temperature of flight compartment airflow 40 is greater than a threshold maximum temperature of the target flight compartment airflow temperature range. As a more specific example, controller 60 may be programmed to regulate a trim airflow valve 36 disposed along flight compartment trim airflow supply duct 24 to regulate the relative proportion of trim airflow 38 in flight compartment airflow 40. In some more specific examples, controller 60 sends control signals 66 to trim airflow valve 36 to regulate the flow rate of trim airflow 38 into flight compartment airflow 40.

Figure 3:
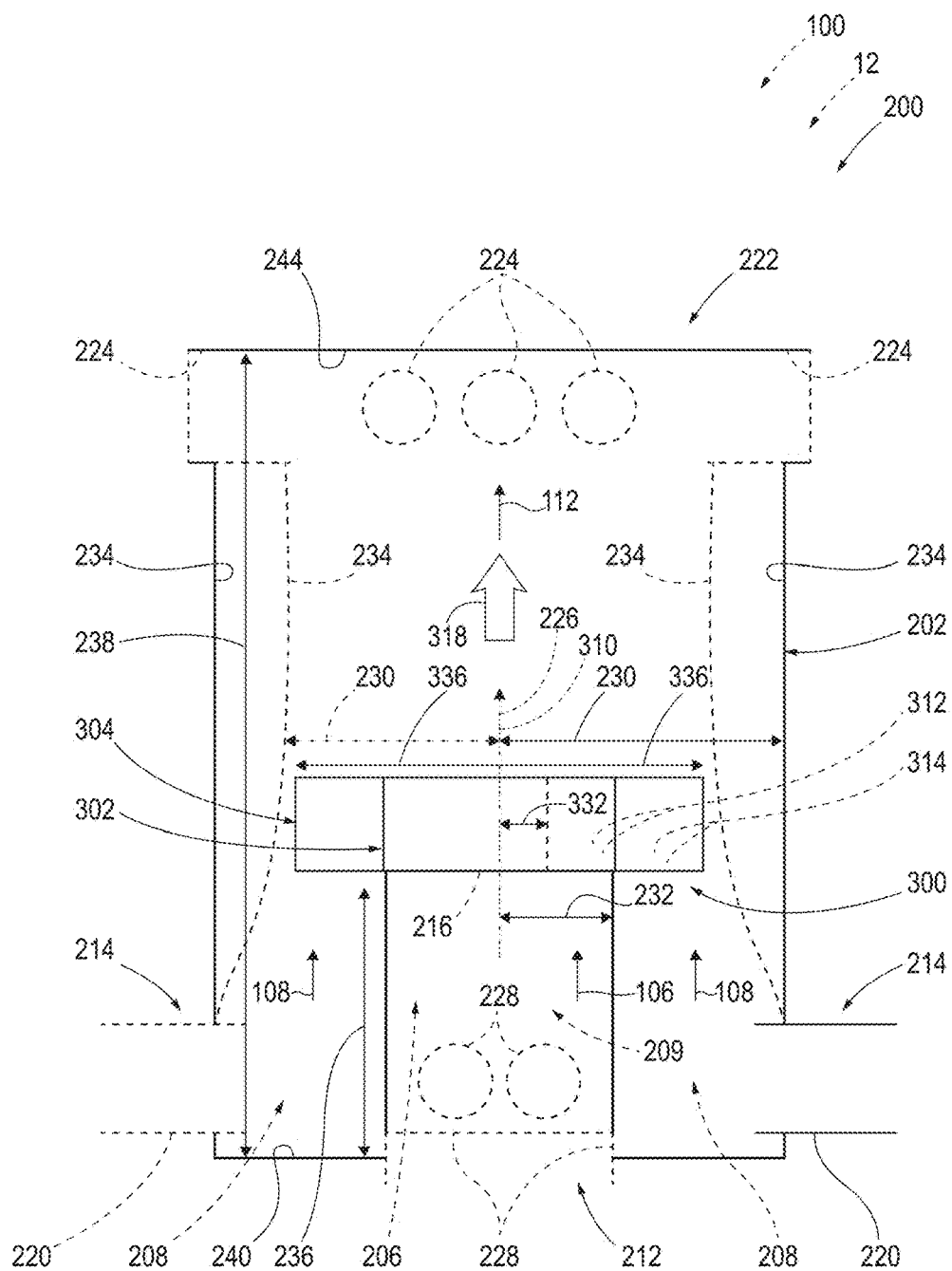
FIG. 3 is a schematic representation of examples of mix manifolds according to the present disclosure.

FIG. 3 is a schematic cross-sectional illustration of examples of mix manifolds 200 that may be included in and/or utilized with environmental control systems 100 and/or aircraft 12 according to the present disclosure. Mix manifolds 200 illustrated and discussed herein with reference to FIG. 2 may include any of the components, features, functions, attributes, etc. as well as variants thereof of mixed manifolds 200 that are illustrated and discussed herein with reference to FIG. 3 without requiring the inclusion of all such components, features, functions, attributes, etc. Likewise, mix manifolds 200 illustrated and discussed herein with reference to FIG. 3 may include any of the components, features, functions, attributes, etc. of mix manifolds 200 discussed herein with reference to FIG. 2 and environmental control systems 100 without requiring all such components, features, functions, attributes, etc. Mix manifolds 200 illustrated and discussed herein with reference to FIG. 3 also may be configured to be utilized with environmental control systems 100 of FIG. 2, in which corresponding components of mix manifolds 200 of FIG. 3 are utilized in a similar, or at least substantially similar manner to that discussed with reference to FIG. 2. However, mix manifolds 200 of FIG. 3 also may be configured to be utilized in other systems without departing from the scope of the present disclosure.

As shown in FIG. 3 mix manifolds 200 are configured to mix first airflow 104 with second airflow 108 to produce mixed airflow 112 therefrom. Mix manifolds 200 include mixing chamber 202 defining central axis 226 that extends through mixing chamber 202, first airflow intake 212 configured to channel first airflow 104 to within the mixing chamber 202, second airflow intake 218 configured to channel second airflow 108 to within the mixing chamber 202, and mixed airflow outlet 224 configured to receive mixed airflow 112 from mixing chamber 202. Mix manifolds 200 further include airflow interleaver 300 disposed within mixing chamber 202. Airflow interleaver 300 includes first airflow guide structure 302 configured to guide second airflow 108 towards central axis 226 and second airflow guide structure 304 configured to guide first airflow 104 away from central axis 226 to facilitate mixing of first airflow 104 with second airflow 108 to produce mixed airflow 112.

In some examples, and as schematically illustrated in FIG. 3, mix manifold 200 defines mixing chamber internal volume 204 that includes first zone 206 for receiving first airflow 104, second zone 208 for receiving second airflow 108, and third zone 210 for receiving mixed airflow 112. In such examples, first airflow intake 212 is configured to supply first airflow 104 to first zone 206, second airflow intake 218 is configured to supply second airflow 108 to second zone 208, and mixed airflow output 222 configured to receive mixed airflow 112 from third zone 210. In some examples, first airflow intake 212 includes first airflow supply conduit 214 extending within the mixing chamber internal volume 204. First airflow supply conduit 214 at least partially surrounds first zone 206 and at least partially separates first zone 206 from second zone 208. First airflow supply conduit 214 defines first airflow inlet 216 that is configured to supply first airflow 104 to third zone 210. In such examples, airflow interleaver 300 defines first airflow inlet 216.

Mix manifold 200 is configured to channel first airflow 104, second airflow 108, and mixed airflow 112 such that first airflow 104 flows through first zone 206 in downstream direction 318, such that second airflow 108 flows through second zone 208 in downstream direction 318, and such that mixed airflow 112 flows through third zone 210 in downstream direction 318. In some examples, first airflow guide structure 302 is positioned immediately adjacent to and in downstream direction 318 of first zone 206 and second airflow guide structure 304 is positioned immediately adjacent to and in downstream direction 318 of second zone 208. In this way, at least a portion of first airflow 104 flows in contact with or through first airflow guide structure 302 and at least a portion of second airflow 108 flows in contact with or through second airflow guide structure 304. Stated differently, first airflow guide structure 302 also is configured to guide first airflow 104 and second airflow guide structure 304 also is configured to guide second airflow 108.

As shown in the examples of FIG. 3, mixing chamber 202 defines a mixing chamber interior surface 234 that defines and/or at least partially surrounds mixing chamber internal volume 204. Mixing chamber interior surface 234 defines any suitable shape. As examples, mixing chamber interior surface 234 may include a cross sectional shape, as taken along a plane perpendicular to central axis 226, that is circular, semi-circular, ovoid, and/or polygonal. In some examples, and as schematically illustrated in dashed lines in FIG. 3, mixing chamber interior surface 234 is venturi-shaped. In particular, and as schematically illustrated in FIG. 3, mixing chamber 202 may be described in terms of a chamber radius 230 that is measured between central axis 226 and mixing chamber interior surface 234 along a direction perpendicular to central axis 226. In an example in which mixing chamber interior surface 234 is venturi-shaped, mixing chamber interior surface 234 is tapered in downstream direction 318, such that chamber radius 230 decreases in downstream direction 318 at least along a portion of an axial height 238 of mixing chamber 202. As defined herein, axial height 238 of mixing chamber 202 is measured along a direction parallel to central axis 226 between a base 240 of mixing chamber 202 and a downstream-most extent 244 of mixing chamber 202. In some examples, mixing chamber interior surface 234 is venturi-shaped to force second airflow 108 towards central axis 226, which improves mixing of first airflow 104 with second airflow 108. In some examples, and as schematically illustrated in dashed lines in FIG. 3, mixing chamber interior surface 234 is tapered such that chamber radius 230 is reduced proximate airflow interleaver 300, which may increase a velocity of airflow proximate airflow interleaver 300, and mixing chamber interior surface 234 may widen proximate mixed airflow output 222, such as to decrease a velocity of mixed airflow 112 therein.

Airflow interleaver 300 is dimensioned and positioned within mixing chamber 202 in any suitable manner. As shown in FIG. 3, airflow interleaver 300 defines a maximum interleaver radius 336 that is measured between central axis 226 and a point on airflow interleaver 300 that is maximally distal central axis 226. As discussed, mixing chamber 202 defines minimum chamber radius 230, which is measured between central axis 226 and a point on mixing chamber interior surface 234 that is proximal maximum interleaver radius 336. In some examples, airflow interleaver 300 and mixing chamber 202 are dimensioned relative to one another and/or airflow interleaver 300 is positioned within mixing chamber 202 such that minimum chamber radius 230 is at most a threshold proportion of maximum interleaver radius 336. In some examples, reducing the proportion of minimum chamber radius 230 to maximum interleaver radius 336 reduces the amount of open area between airflow interleaver 300 and mixing chamber interior surface 234. Accordingly, in such examples, limiting minimum chamber radius 230 relative to maximum interleaver radius 336 forces a larger proportion of second airflow 108 to pass through airflow interleaver 300 rather than flowing around the outside of airflow interleaver 300, which, in some examples, enhances mixing of first airflow 104 with second airflow 108. Additionally or alternatively, in some examples, maximum interleaver radius 336 and minimum chamber radius 230 are dimensioned such that airflow interleaver 300 and mixing chamber interior surface 234 are non-contacting, such as to prevent rattle therebetween. Stated differently, in such examples, airflow interleaver 300 is spaced apart from mixing chamber interior surface 234. Examples of the threshold proportion of the minimum chamber radius 230 to maximum interleaver radius 336 include 100%, at least 101%, at least 102%, at least 103%, at least 104%, at least 105%, least 110%, at least 120%, at most 105%, at most 110%, at most 120%, and/or at most 150%.

As discussed in more detail herein, airflow interleaver 300 extends around and defines an interleaver axis 310. In some examples, airflow interleaver 300 is positioned within mixing chamber 202 such that interleaver axis 310 is aligned with, at least substantially parallel to, and/or at least substantially collinear with central axis 226. In some examples in which mix manifold 200 includes first airflow supply conduit 214, first airflow supply conduit 214 positions airflow interleaver 300 within mixing chamber 202 such as discussed above. More specifically, in some examples, first airflow supply conduit 214 is positioned within mixing chamber 202 such that central axis 226 extends centrally through first airflow supply conduit 214, and such that central axis 226 also defines a central axis of first airflow supply conduit 214.

As shown in FIG. 3, first airflow supply conduit 214 defines a supply conduit open central region 209 that is configured to channel first airflow 104 and/or to at least partially surround first zone 206. Supply conduit open central region 209 defines a supply conduit inner radius 232 that is measured between central axis 226 and a portion of first airflow supply conduit 214 facing supply conduit open central region 209. In some examples, first airflow guide structure 302 of airflow interleaver 300 is positioned directly downstream of supply conduit open central region 209. First airflow guide structure 302 defines a first airflow guide structure innermost radial extent 332, which is measured between central axis 226 and a point on first airflow guide structure 302 that is nearest to central axis 226. In some examples, first airflow guide structure 302 and/or first airflow supply conduit 214 are dimensioned such that first airflow guide structure innermost radial extent 332 is at most a threshold proportion of supply conduit inner radius 232. In some examples, reducing supply conduit inner radius 232 relative to first airflow guide structure innermost radial extent 332 reduces the amount of open volume extending between supply conduit open central region 209 and third zone 210 of mixing chamber internal volume 204. In some such examples, this forces a larger proportion of first airflow 104 to pass through first airflow guide structure 302, rather than passing directly from supply conduit open central region 209 to third zone 210 of mixing chamber 202, which may enhance mixing of first airflow 104 and second airflow 108. Examples of the threshold proportion of first airflow guide structure innermost radial extent 332 to supply conduit inner radius 232 include at most 20%, at most 15%, at most 10%, at most 8%, at most 6%, at most 5%, at most 4%, at most 3% at most 2%, at most 1%, at most 0.5%, at most 0.1%, at most 0.01%, and/or at least 0.01%.

In some examples, airflow interleaver 300 is positioned at a selected axial position 236 within mixing chamber 202. As defined herein, axial position 236 of airflow interleaver 300 is measured along a direction parallel to central axis 226 as the distance between base 240 of mixing chamber 202 a base 344 of airflow interleaver 300. As referred to herein, base 344 of airflow interleaver 300 is a region of airflow interleaver 300 positioned nearest base 240 of mixing chamber 202. In some examples, axial position 236 of airflow interleaver 300 is selected to adjust the volume of third zone 210 relative to first zone 206 and/or second zone 208. Additionally or alternatively, in some examples, axial position 236 of airflow interleaver 300 is selected such that airflow interleaver 300 is positioned with a desired separation extending between mixing chamber interior surface 234 and airflow interleaver 300, such as when mixing chamber interior surface 234 is venturi-shaped. In some examples, axial position 236 of airflow interleaver 300 may be described as a threshold proportion of axial height 238 of mixing chamber 202, with examples of the threshold proportion including at least 5%, at least 10%, at least 15%, at least 20%, at least 25%, at least 30%, at least 35%, at least 40%, at least 45%, at least 50%, at least 60%, at most 10%, at most 15%, at most 20%, at most 25%, at most 30%, at most 35%, at most 40%, at most 45%, at most 50%, at most 60%, at most 70%, and/or at most 80%.

In some examples, first airflow guide structure 302 includes, and optionally consists of, a plurality of converging airflow guides 312 that extend towards central axis 226. In some examples, second airflow guide structure 304 includes, and optionally consists of, a plurality of diverging airflow guides 314 that extend away from central axis 226. In such examples, diverging airflow guides 314 define maximum interleaver radius 336 and converging airflow guides 312 define first airflow guide structure innermost radial extent 332.

As discussed in more detail herein, in some examples, airflow interleaver 300 includes a tubular body 306 defining an open central region 308. In some such examples, tubular body 306 extends from, is continuous with, and/or defines first airflow supply conduit 214. In some examples, open central region 308 of tubular body is continuous with and/or includes supply conduit open central region 309.

With continued reference to FIG. 3, and as discussed, first airflow intake 212 includes at least one, and optionally a plurality of, first airflow ports 228 configured to supply first airflow 104 to mixing chamber 202. When first airflow intake 212 includes first airflow supply conduit 214, first airflow ports 228 are in fluid communication with first airflow supply conduit 214. First airflow intake 212 includes any suitable number of first airflow ports 228, such as at least one first airflow port 228, at least two first airflow ports 228, at least three first airflow ports 228, at least four first airflow ports 228, at least five first airflow ports 228, at most six first airflow ports 228, and/or at most ten first airflow ports 228. In some examples, one or more first airflow port(s) 228 extend through base 240 of mixing chamber 202. Additionally or alternatively, in some examples, one or more first airflow ports 228 extend through a sidewall of mixing chamber 202, such as into first airflow supply conduit 214. As discussed herein, the sidewall of mixing chamber 202 may define mixing chamber interior surface 234 and/or extend between base 240 of mixing chamber 202 and downstream-most extent 244 of mixing chamber 202. In some examples in which mixing chamber 202 includes first airflow supply conduit 214, first airflow port(s) 228 only are in direct fluid communication with first zone 206 and/or with first airflow supply conduit 214. In other words, in such examples, first airflow port(s) 228 do not supply first airflow 104 to second zone 208.

Similarly, and as discussed, second airflow intake 218 includes at least one, and optionally a plurality of second airflow inlets 220 configured to supply second airflow to mixing chamber 202. In some examples, one or more second airflow inlets 220 extend through base 240 of mixing chamber 202. Additionally or alternatively, in some examples, one or more second airflow inlets 220 extend through the sidewall of mixing chamber 202. In some examples, second airflow inlet(s) 220 are positioned further from central axis 226 than first airflow ports 228. In some examples, second airflow inlets 220 only are in direct fluid communication with second zone 208, and are at least partially isolated from fluid communication with first zone 206 by first airflow supply conduit 214. Second airflow intake 218 includes any suitable number of second airflow inlets 220, such as at least one second airflow inlet 220, at least two second airflow inlets 220, at least three second airflow inlets 220, at least four second airflow inlets 220, at least five second airflow inlets 220, at most six second airflow inlets 220, and/or at most ten second airflow inlets 220.

Likewise, and as discussed, mixed airflow output 222 includes at least one, and optionally a plurality of, mixed airflow outlets 224 configured to receive mixed airflow 112 from mixing chamber 202. As shown in FIG. 3, mixed airflow outlet(s) 224 are positioned in downstream direction 318 of each of first airflow port(s) 228, second airflow inlet(s) 220, and airflow interleaver 300. In some examples, mixed airflow outlet(s) 224 are staggered about a circumference of mixing chamber 202, such as to supply mixed airflow 112 in a plurality of directions from mixing chamber 202. Mixed airflow output 222 includes any suitable number of mixed airflow outlets 224, examples of which include at least one mixed airflow outlet 224, at least two mixed airflow outlets 224, at least three mixed airflow outlets 224, at least four mixed airflow outlets 224, at least five mixed airflow outlets 224, at most six mixed airflow outlets 224, and/or at most ten mixed airflow outlets 224.

Figure 4:
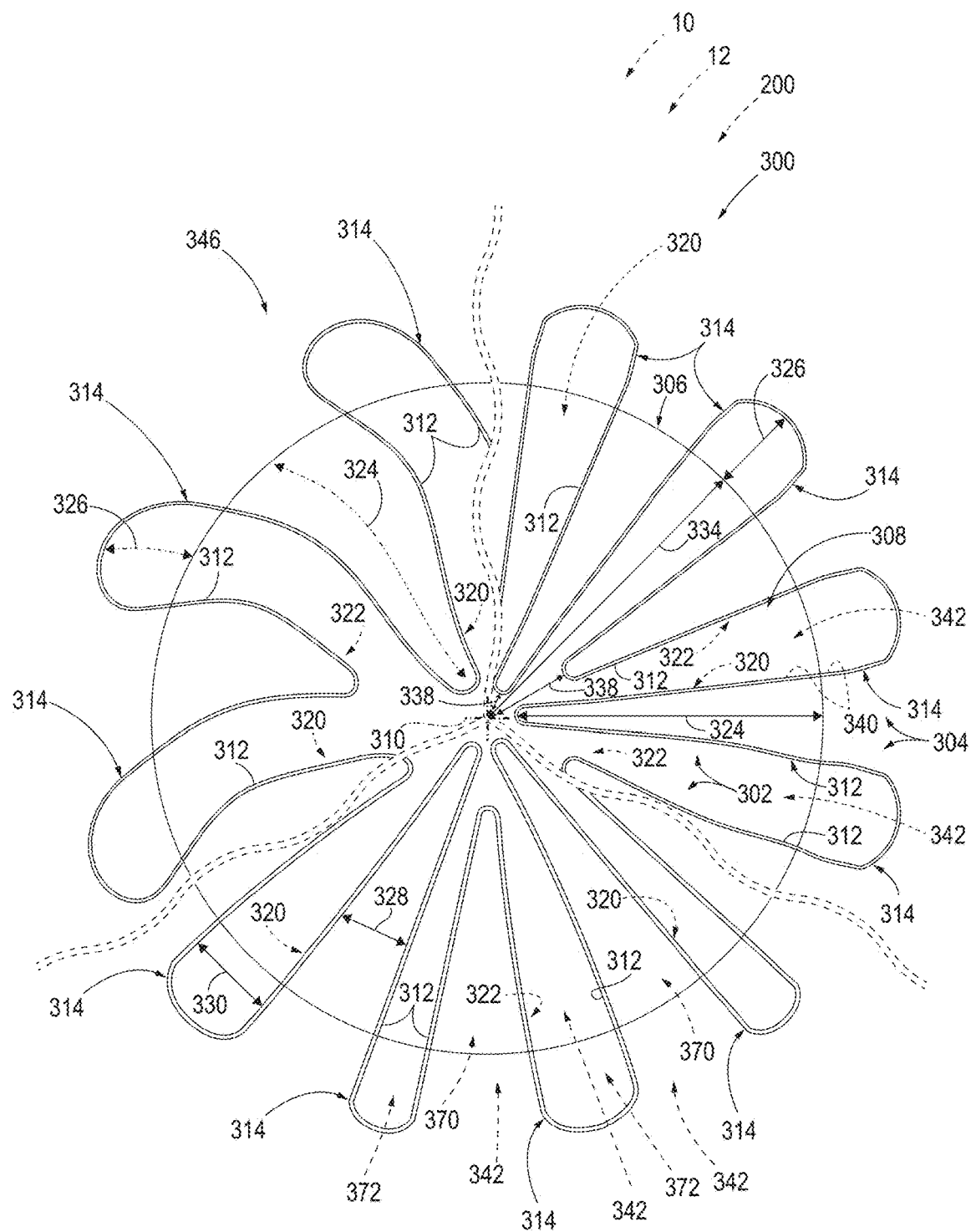
FIG. 4 is a schematic plan view of examples of airflow interleavers according to the present disclosure.

FIG. 4 is a schematic plan view representing examples of airflow interleavers 300 that may be included in and/or utilized with mix manifolds 200 illustrated and discussed herein with reference to FIGS. 2 and 3 and/or with environmental control systems 100 illustrated and discussed herein with reference to FIG. 2. Where appropriate, reference numerals from FIGS. 2 and 3 are utilized to designate corresponding parts in the examples of FIG. 4. Airflow interleavers 300 illustrated and discussed herein with reference to FIGS. 2 and 3 may include any of the components, features, functions, attributes, etc., as well as variants thereof, of airflow interleavers 300 that are illustrated and discussed herein with reference to FIG. 4 without requiring the inclusion of all such components, features, functions, attributes, etc. Likewise, airflow interleavers 300 illustrated and discussed herein with reference to FIG. 4 may include any of the components, features, functions, attributes, etc., as well as variants thereof, of airflow interleavers 300 illustrated and discussed herein with reference to FIGS. 2 and 3 without requiring all such features, functions, attributes, etc. In some examples, airflow interleavers 300 of FIG. 4 are configured to be utilized with mix manifolds 200 of FIG. 2 and/or FIG. 3 and/or with environmental control systems 100 of FIG. 2. However, airflow interleavers 300 of FIG. 4 may be configured to be utilized in other systems and/or devices without departing from the scope of the present disclosure.

In FIG. 4, three cut lines are utilized to more clearly illustrate various features, components, conformations, etc. that may be included in airflow interleavers 300 according to the present disclosure. In particular, airflow interleavers 300 are illustrated in three sections including a top right section, a bottom section, and a top left section that are separated from one another by the cut lines. In some instances, the following discussion makes reference to examples of airflow interleavers 300 that are illustrated in one or more of these sections. However, the features, components, conformations, etc. of airflow interleavers 300 illustrated in each of these sections are non-exclusive, and airflow interleavers 300 can incorporate any suitable combination of the features, components, conformations, etc. illustrated in any of these sections, and/or combinations thereof, without departing from the scope of the present disclosure.

Figure 5:
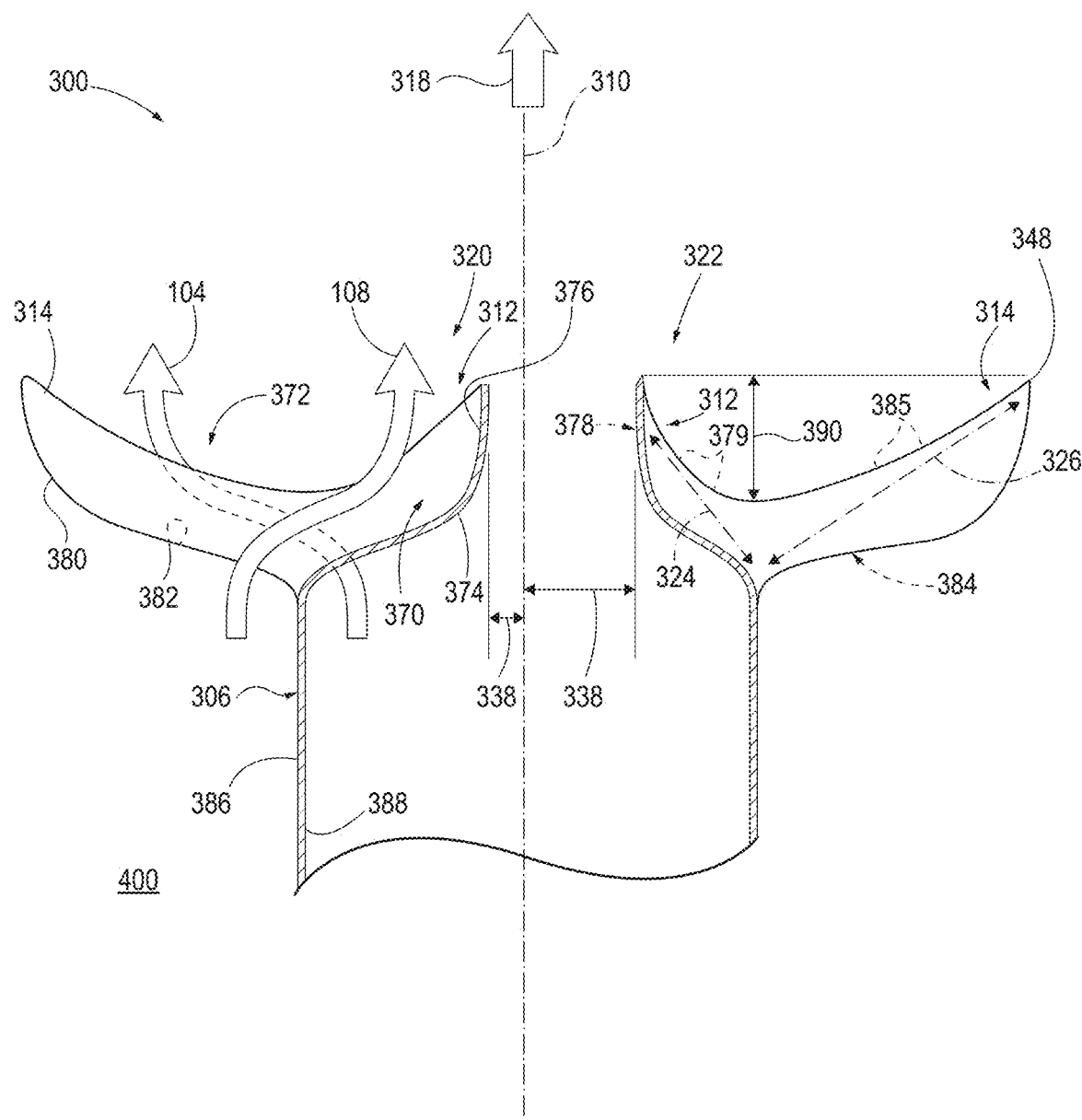
FIG. 5 is a schematic cross-sectional view of examples of airflow interleavers according to the present disclosure.

As shown in FIG. 4, airflow interleavers 300 include tubular body 306 that extends around and defines interleaver axis 310 that extends positively in the downstream direction 318 that is illustrated and discussed herein with reference to FIGS. 2, 3, and 5. Airflow interleavers 300 also include first airflow guide structure 302 comprising, and optionally consisting of, a plurality of converging airflow guides 312 that extend from tubular body 306 radially towards interleaver axis 310. Airflow interleavers 300 further include second airflow guide structure 304 comprising, and optionally consisting of, a plurality of diverging airflow guides 314 that extend from tubular body 306 radially away from interleaver axis 310. As illustrated and discussed in more detail herein with reference to FIG. 5, in some examples, converging airflow guides 312 and diverging airflow guides 314 also extend in downstream direction 318.

As shown in FIG. 4, the plurality of converging airflow guides 312 are azimuthally interleaved with the plurality of diverging airflow guides 314. Stated differently, the plurality of converging airflow guides 312 and the plurality of diverging airflow guides 314 are circumferentially alternating with one another. The plurality of converging airflow guides 312 and the plurality of diverging airflow guides 314 collectively are configured to interleave a plurality of first airflow streams flowing from tubular body 306 in downstream direction 318 with a plurality second airflow streams flowing from a region 400 external to tubular body 306 in downstream direction 318 to produce mixed airflow 112 therefrom. For some examples in which airflow interleaver 300 is included in mix manifolds 200 of FIGS. 2 and 3, region 400 external to tubular body is included in, or is, second zone 208 of mixing chamber 202.

In some examples, tubular body 306 bounds open central region 308 that is configured to channel first airflow 104 and to at least partially separate first airflow 104 from second airflow 108 passing in region 400 external to tubular body 306 in downstream direction 318. In some examples, airflow interleaver 300 is configured to partition first airflow 104 flowing in downstream direction 318 into the plurality of first airflow streams and to partition second airflow 108 flowing in downstream direction 318 through region 400 exterior to tubular body 306 into the plurality of second airflow streams. More specifically, in some examples, converging airflow guides 312 are positioned directly in downstream direction 318 of open central region 308 and are configured to partition first airflow 104 into the plurality of first airflow streams. In some examples, diverging airflow guides 314 are positioned directly in downstream direction 318 of region 400 exterior to tubular body 306 and are configured to partition second airflow 108 into the plurality of second airflow streams. In some examples, converging airflow guides 312 are configured guide the plurality of second airflow streams towards interleaver axis 310, and diverging airflow guides 314 are configured to guide the plurality of first airflow streams away from interleaver axis 310.

As shown in FIG. 4, in some examples, converging airflow guides 312 define a corresponding plurality of inter-guide voids 342, each of which extends between and separates a respective pair of adjacent converging airflow guides 312. Similarly, in some examples, diverging airflow guides 314 define a corresponding plurality of inter-guide voids 342, each of which extends between and separates a respective pair of adjacent diverging airflow guides 314. In some examples, each inter-guide void 342 defined by converging airflow guides 312 is configured to channel a first airflow stream, and optionally to direct the first airflow stream towards a diverging airflow guide 314 that is azimuthally interleaved between the corresponding pair of adjacent converging airflow guides 312. Similarly, in some examples, each inter-guide void 342 defined by diverging airflow guides 314 is configured to channel a second airflow stream, and optionally direct the second airflow stream towards a converging airflow guide 312 that is azimuthally interleaved between the corresponding pair of diverging airflow guides 314.

In some examples, and as shown in FIG. 4, the plurality of converging airflow guides 312 includes, and optionally consists of, a first subset 320 of converging airflow guides 312 and a second subset 322 of converging airflow guides 312. In such examples, each converging airflow guide 312 of first subset 320 extends closer to interleaver axis 310 than does each converging airflow guide 312 of second subset 322. First subset 320 of converging airflow guides 312 are azimuthally interleaved with second subset 322 of converging airflow guides 312. Stated differently, first subset 320 and second subset 322 of converging airflow guides 312 are circumferentially alternating with one another such that each converging airflow guide 312 of first subset 320 is positioned between, or interposes, a respective pair of adjacent converging airflow guides 312 of second subset 322, and vice-versa. Arranging converging airflow guides 312 into first subset 320 and second subset 322 as discussed permits converging airflow guides 312 of first subset 320 to extend closer to interleaver axis 310 than would any converging airflow guide 312 in an alternative arrangement in which all converging airflow guides 312 extend to an equivalent distance from interleaver axis 310. Stated differently, by arranging converging airflow guides 312 into first subset 320 and second subset 322, each converging airflow guide 312 of first subset 320 may extend closer to interleaver axis 310 without contacting and/or intersecting another converging airflow guide 312 as compared to an arrangement in which all converging airflow guides 312 extend an equivalent distance from interleaver axis 310. In some examples, arranging converging airflow guides 312 into first subset 320 and second subset 322 as discussed permits the plurality of converging airflow guides 312 to fluidly contact and/or guide a larger proportion of first airflow 104 and enhances mixing of first airflow 104 with second airflow 108 relative to a configuration in which all converging airflow guides 312 extend to an equivalent distance from interleaver axis 310.

With continued reference to FIG. 4, tubular body 306 defines a tubular body inner radius 334, which is measured between interleaver axis 310 and a portion of tubular body 306 facing interleaver axis 310. Each respective converging airflow guide 312 defines a converging airflow guide innermost radial extent 338, which is measured between interleaver axis 310 and a point on the respective converging airflow guide 312 that is positioned nearest to interleaver axis 310. In some examples, converging airflow guide innermost radial extent 338 of at least one converging airflow guide 312, and optionally of each converging airflow guide 312, is less than a converging airflow guide threshold proportion of tubular body inner radius 334. Examples of the converging airflow guide threshold proportion include at most 20%, at most 15%, at most 10%, at most 8%, at most 6%, at most 5%, at most 4%, at most 3% at most 2%, at most 1%, at most 0.5%, at most 0.1%, at most 0.01%, and/or at least 0.01%. In an example in which the plurality of converging airflow guides 312 includes first subset 320 and second subset 322 as described herein, each converging airflow guide 312 of first subset 320 defines a smaller converging airflow guide innermost radial extent 338 than does each converging airflow guide 312 of second subset 322. Converging airflow guide innermost radial extent 338 of at least one converging airflow guide 312 defines first airflow guide structure innermost radial extent 332 illustrated and discussed herein with reference to FIG. 3.

Airflow interleavers 300 are formed from any of a variety of materials. In some examples, converging airflow guides 312 and diverging airflow guides 314 are formed of the same one or more materials as one another and/or the same one or more materials as tubular body 306. Additionally or alternatively, in some examples, converging airflow guides 312 and diverging airflow guides 314 are formed of one or more different materials than one another and/or one or more different materials from that of tubular body 306. Examples of suitable materials for forming airflow interleaver 300, converging airflow guides 312, diverging airflow guides 314, and/or tubular body 306 include one or more composite materials, one or more polymeric materials, one or more polymers, one or more reinforced polymers, one or more plastics, one or more thermoplastics, one or more ceramics, one or more metals, one or more sintered metals, one or more heat treated metals, aluminum, aluminum alloys, aluminum silicon magnesium alloys, iron, steel, iron alloys, titanium, titanium alloys, and/or combinations thereof.

In some examples, and as shown in FIG. 4, airflow interleavers 300 include an undulating wall 340 that forms at least a portion of at least one converging airflow guide 312 and at least a portion of at least one diverging airflow guide 314 that is adjacent to the at least one converging airflow guide 312. In some such examples, undulating wall 340 forms each converging airflow guide 312 of the plurality of converging airflow guides 312 and each diverging airflow guide 314 of the plurality of diverging airflow guides 314. Stated differently, in some examples, converging airflow guides 312 define portions of undulating wall 340 that extend towards interleaver axis 310 and diverging airflow guides 314 define portions of undulating wall 340 that extend away from interleaver axis 310. More specifically, in some such examples, undulating wall 340 is a single wall, a continuous wall, and/or an uninterrupted wall. In some examples, undulating wall 340 is continuous with, integrally formed with, monolithic with, and/or defines tubular body 306, and/or vice-versa. In such examples, tubular body 306 may be described as including and/or terminating in undulating wall 340.

Tubular body 306 may include and/or define any of a variety of shapes. Similarly, open central region 308 of tubular body 306 may include and/or define any of a variety of shapes. In some examples, tubular body 306 is tubular, hollow, and/or includes an at least substantially cylindrical external shape. In some examples, tubular body 306 includes a cross-sectional shape, as taken along a plane perpendicular to interleaver axis 310, that is circular, semi-circular, ovoid, and/or a polygonal shape.

Airflow interleaver 300 includes any suitable number of converging airflow guides 312 and/or diverging airflow guides 314. As examples, the number of converging airflow guides 312 and/or diverging airflow guides 314 may be selected based upon tubular body inner radius 334, converging airflow guide outermost azimuthal dimension 328, and/or diverging airflow guide outermost azimuthal dimension 330, and/or a flow rate, pressure, and/or velocity of first airflow 104 and/or of second airflow 108. More specific examples of suitable numbers of converging airflow guides 312 include at least three converging airflow guides 312, at least four converging airflow guides 312, at least five converging airflow guides 312, at least six converging airflow guides 312, at least eight converging airflow guides 312, at least ten converging airflow guides 312, at least twelve converging airflow guides 312, at least fourteen converging airflow guides 312, at least fifteen converging airflow guides 312, at least twenty converging airflow guides 312, at most twelve converging airflow guides 312, at most fourteen converging airflow guides 312, at most fifteen converging airflow guides 312, at most twenty converging airflow guides 312, at most thirty converging airflow guides 312, at most forty converging airflow guides 312, at most fifty converging airflow guides 312, at most seventy converging airflow guides 312, at most eighty converging airflow guides 312, and/or at most one hundred converging airflow guides 312. More specific examples of suitable numbers of diverging airflow guides 314 include at least three diverging airflow guides 314, at least four diverging airflow guides 314, at least five diverging airflow guides 314, at least six diverging airflow guides 314, at least eight diverging airflow guides 314, at least ten diverging airflow guides 314, at least twelve diverging airflow guides 314, at least fourteen diverging airflow guides 314, at least fifteen diverging airflow guides 314, at least twenty diverging airflow guides 314, at most twelve diverging airflow guides 314, at most fourteen diverging airflow guides 314, at most fifteen diverging airflow guides 314, at most twenty diverging airflow guides 314, at most thirty diverging airflow guides 314, at most forty diverging airflow guides 314, at most fifty diverging airflow guides 314, at most seventy diverging airflow guides 314, at most eighty diverging airflow guides 314, and/or at most one hundred diverging airflow guides 314.

As shown in FIG. 4, each converging airflow guide 312 extends along and defines a respective converging airflow guide radial axis 324, and each diverging airflow guide 314 extends along and defines a respective diverging airflow guide radial axis 326. In some examples, converging airflow guide radial axis 324 extends centrally along the respective converging airflow guide 312 and/or along an azimuthal center of the respective converging airflow guide 312. Likewise, in some examples, diverging airflow guide radial axis 326 extends centrally along the respective diverging airflow guide 314 and/or along an azimuthal center of the respective diverging airflow guide 314.

As referred to herein, the azimuthal center of a component refers to a center of the component, as measured along an azimuthal direction at a given radial distance from interleaver axis 310. As used herein, the term "radial distance," as used to describe a distance from an axis (such as interleaver axis 310), refers to a distance as measured along a direction that extends from, and is perpendicular to, interleaver axis 310. As used herein, the term "azimuthal direction," as used to describe a direction relative to an axis (such as interleaver axis 310), refers a direction along a circle that is centered on the axis and that extends in a plane that is perpendicular to the axis.

In some examples, and as shown in FIG. 4, each respective converging airflow guide 312 of the plurality of converging airflow guides 312 defines a respective converging airflow channel 370 that extends along the respective converging airflow guide radial axis 324 and that is configured to guide at least a portion of one or more of the second airflow streams towards interleaver axis 310. In some such examples, each converging airflow channel 370 is in fluid communication with at least region 400 exterior to tubular body 306 and a region downstream of the respective converging airflow guide 312. Similarly, in some examples, and as shown in FIG. 4, each diverging airflow guide 314 defines a respective diverging airflow channel 372 that extends along the respective diverging airflow guide radial axis 326 and that is configured to guide at least a portion of one or more of the first airflow streams away from interleaver axis 310. In some such examples, each diverging airflow channel 372 is in fluid communication with open central region 308 and a region downstream of the respective diverging airflow guide 314. In some examples in which airflow interleavers 300 of FIG. 4 are included in mix manifolds 200, region 400 exterior to tubular body 306 corresponds to second zone 208 of mixing chamber 202, open central region 308 corresponds to first zone 206 of mixing chamber 202, and the region downstream of converging airflow guides 312 and/or diverging airflow guides 314 corresponds to third zone 210 of mixing chamber 202.

In some examples, each inter-guide void 342 defined by adjacent converging airflow guides 312 is azimuthally aligned with a respective diverging airflow channel 372 of a respective diverging airflow guide 314 and is configured to channel at least one first airflow stream towards the respective diverging airflow channel 372. Likewise, in some examples, each inter-guide void 342 defined by adjacent diverging airflow guide 314 is azimuthally aligned with a respective converging airflow channel 370 of a respective converging airflow guide 312 and is configured to channel at least one second airflow stream towards the converging airflow channel 370.

Each converging airflow guide 312 may be configured such that the respective converging airflow guide radial axis 324 is linear or non-linear. Similarly, each diverging airflow guide 314 may be configured such that the respective diverging airflow guide radial axis 326 is linear or non-linear. The top right section and bottom section of FIG. 4 show examples in which the respective diverging airflow guide radial axis 326 of each diverging airflow guide 314 is linear and in which the respective converging airflow guide radial axis 324 of each converging airflow guide 312 is linear. In some such examples, airflow interleaver 300 is configured to operate as a flow straightener, in which airflow interleaver 300 is configured to interleave first airflow 104 and second airflow 108 with one another without imparting spin or vortexing in mixed airflow 112. In some such examples, airflow interleaver 300 is configured to be utilized with mix manifold 200, to be utilized as mix manifold airflow interleaver 350, and/or to be utilized as flight compartment airflow interleaver 365 discussed herein with reference to FIGS. 2 and 3.

The top left section of FIG. 4 represents examples in which airflow interleaver 300 is a spin-inducing conformation 346 that is configured to induce spin and/or vortexing in mixed airflow 112. In such examples, the respective converging airflow guide radial axis 324 of each converging airflow guide 312 is non-linear, and/or the respective diverging airflow guide radial axis 326 of each diverging airflow guide 314 is non-linear. In particular, in such examples, each converging airflow guide radial axis 324 and each diverging airflow guide radial axis 326 is curved, or includes one or more curves, in a plane perpendicular to interleaver axis 310 and/or in the azimuthal direction discussed herein. Stated differently, each converging airflow guide radial axis 324 and each diverging airflow guide radial axis 326 is curved, or includes one or more curves, at least when viewed from a point along interleaver axis 310 that is upstream or downstream of diverging airflow guides 314 and converging airflow guides 312. As referred to herein, the terms "a direction that is upstream," "an upstream direction," and the like refer to a direction that is opposite downstream direction 318. In some of these examples, converging airflow guides 312 and/or diverging airflow guides 314 are configured to guide the plurality of first airflow streams and the plurality of second airflow streams along a plurality of curved paths, such as to induce spin or vortexing therein. While FIG. 4 illustrates examples of spin-inducing conformation 346 in which both converging airflow guides 312 and diverging airflow guides 314 define respective curved radial axes, in other examples of spin-inducing conformation 346, only one of converging airflow guides 312 and diverging airflow guides 314 define respective curved radial axes.

With continued reference to FIG. 4, each diverging airflow guide 314 defines a diverging airflow guide outermost azimuthal dimension 330 that is measured at a particular point along diverging airflow guide radial axis 326 and transverse to each of diverging airflow guide radial axis 326 and interleaver axis 310. Likewise, each converging airflow guide 312 defines a converging airflow guide outermost azimuthal dimension 328 that is measured at a particular point along converging airflow radial axis 324 and transverse to each of converging airflow guide radial axis 324 and interleaver axis 310. In some examples, diverging airflow guide outermost azimuthal dimension 330 varies with respect to diverging airflow guide radial axis 326. As schematically represented in the examples of FIG. 4, in some examples, diverging airflow guide outermost azimuthal dimension 330 of at least some diverging airflow guides tapers or decreases with increasing radial distance from interleaver axis 310. In some examples, converging airflow guide outermost azimuthal dimension 328 varies with respect to converging airflow guide radial axis 324. As schematically represented in the examples of FIG. 4, in some examples, converging airflow guide outermost azimuthal dimension 328 decreases or tapers with decreasing radial distance from interleaver axis 310.

As shown in the bottom section of FIG. 4, converging airflow guide outermost azimuthal dimension 328 of each converging airflow guide 312 may be the same as or different from converging airflow guide outermost azimuthal dimension 328 of one or more other converging airflow guides 312, as measured at corresponding points along the respective converging airflow guide radial axes. Similarly, as shown in the bottom section of FIG. 4, converging airflow guide outermost azimuthal dimension 328 of each converging airflow guide 312, such as measured at a midpoint along converging airflow guide radial axis 324, may be the same as or different from diverging airflow guide outermost azimuthal dimension 330 of one or more diverging airflow guides 314, such as measured along a midpoint along diverging airflow guide radial axis 326. Likewise, diverging airflow guide outermost azimuthal dimension 330 of each diverging airflow guide 314 may be the same as, or different from, diverging airflow guide outermost azimuthal dimension 330 of one or more other diverging airflow guides 314, such as measured at corresponding points along the respective diverging airflow guide radial axes. Similarly, diverging airflow guide outermost azimuthal dimension 330 of one or more diverging airflow guides 314 may be the same as, or different from, converging airflow guide outermost azimuthal dimension 328 of one or more converging airflow guides 312.

As also shown in FIG. 4, each diverging airflow guide 314 defines an outermost radial dimension that is measured along the respective diverging airflow guide radial axis 326 and between tubular body 306 and an outermost radial extent 339 of the respective diverging airflow guide 314. Likewise, each converging airflow guide 312 defines an outermost radial dimension that is measured along the respective converging airflow guide radial axis 324 and between tubular body 306 and converging airflow guide innermost radial extent 338 of the respective converging airflow guide 312. Converging airflow guides 312 and diverging airflow guides 314 may be dimensioned relative to one another such that the magnitude of the outermost radial dimension of each converging airflow guide 312 is the same as, greater than, or less than the magnitude of the outermost radial dimension of each diverging airflow guide 314.

FIG. 5 is a schematic cross-sectional view representing examples of airflow interleavers 300 according to the present disclosure. More specifically, the cross-section shown in FIG. 5 is taken along converging airflow guide radial axis 324 of a converging airflow guide 312 of first subset 320 and along converging airflow guide radial axis 324 of a converging airflow guide 312 of second subset 322. As shown here, converging airflow guide 312 of first subset 320 extends closer to interleaver axis 310 than does converging airflow guide 312 of second subset 322, such that converging airflow guide innermost radial extent 338 of converging airflow guide 312 of first subset 320 is smaller than converging airflow guide innermost radial extent 338 of converging airflow guide 312 of second subset 322.

As mentioned, in some examples, and as shown in FIG. 5, converging airflow guide 312 and/or diverging airflow guide 314 extends from tubular body 306 at least partially in downstream direction 318. More specifically, in some such examples, and as shown in FIG. 5, each converging airflow guide 312 extends from tubular body 306 towards interleaver axis 310 and partially in downstream direction 318. Similarly, in some such examples, and as shown in FIG. 5, each diverging airflow guide 314 extends away from interleaver axis 310 and partially in downstream direction 318. In some examples, and as shown in FIG. 5, each of converging airflow guide 312 and/or diverging airflow guide 314 may be described as defining a respective outermost axial extent 348. Specifically, in such examples, outermost axial extent 348 of converging airflow guide 312 and/or of diverging airflow guide 314 refers to a portion, a point, and/or a location on converging airflow guide 312 or on diverging airflow guide 314 that is maximally distal to tubular body 306, as measured along a direction parallel to interleaver axis 310. In some examples, outermost axial extent 348 of one or more converging airflow guides 312, and optionally of each converging airflow guide 312, is at least substantially aligned with the outermost axial extent 348 of one or more diverging airflow guides 314, and optionally of each diverging airflow guide 314 as measured along a direction parallel to interleaver axis 310. Additionally or alternatively, in some examples, outermost axial extent 348 of one or more converging airflow guides 312 is offset from outermost axial extent 348 of one or more diverging airflow guides 314 as measured along a direction parallel to interleaver axis 310.

Also shown in FIG. 5, converging airflow channel 370 of each converging airflow guide 312 is configured to guide second airflow 108, or at least one second airflow stream thereof, towards interleaver axis 310 and in downstream direction 318. Similarly, and as shown in FIG. 5, diverging airflow channel 372 of each diverging airflow guide 314 is configured to guide first airflow 104, or at least one first airflow stream thereof, away from interleaver axis 310 and in downstream direction 318. In some examples, each converging airflow guide 312 defines a respective converging airflow guide first surface 374 and a respective converging airflow guide second surface 376 that is opposed to converging airflow guide first surface 374. At least a portion of converging airflow guide first surface 374 faces open central region 308. In some examples, converging airflow guide second surface 376 at least partially defines converging airflow channel 370. In some examples, converging airflow guide first surface 374 is continuous with an interior surface 388 of tubular body 306 and converging airflow guide second surface 376 is continuous with an exterior surface 386 of tubular body 306.

In some examples, each diverging airflow guide 314 defines a diverging airflow guide first surface 380 and a diverging airflow guide second surface 382 that is opposed to diverging airflow guide first surface 380. At least a portion of diverging airflow guide first surface 380 faces region 400 exterior to tubular body 306. In some examples, diverging airflow guide second surface 382 at least partially defines diverging airflow channel 372. In some examples, diverging airflow guide first surface 380 is continuous with exterior surface 386 of tubular body 306 and diverging airflow guide second surface 382 is continuous interior surface 388 of tubular body 306. In some examples, converging airflow guide first surface 374 is continuous with diverging airflow guide second surface 382. In some examples, converging airflow guide second surface 376 is continuous with diverging airflow guide first surface 380.

In some examples, and as shown in FIG. 5, each converging airflow guide 312 is formed from a converging airflow guide wall 378 that defines converging airflow guide first surface 374 and converging airflow guide second surface 376. Stated differently, in such examples, and as shown in FIG. 5, converging airflow guide first surface 374 and converging airflow guide second surface 376 refer to opposite sides and/or surfaces of converging airflow guide wall 378. In some examples, converging airflow guide wall 378 is troughed and/or U-shaped arcuate transverse to converging airflow guide radial axis 324 and forms and/or terminates in a pair of converging airflow guide wall edges 379, which define an open upper face of converging airflow channel 370. In some examples, converging airflow guide wall 378 is curved and/or tilted upwardly in downstream direction 318 along converging airflow guide radial axis 324 and defines a cutout depth 390. As shown in FIG. 5, cutout depth 390 is measured along a direction parallel to interleaver axis 310 and between outermost axial extent 348 of the respective converging airflow guide 312 and a location along wall edges 379 of the respective converging airflow guide 312 that is axially aligned with tubular body 306.

In some examples, and as shown in FIG. 5, each diverging airflow guide 314 is formed from a diverging airflow guide wall 384 that defines diverging airflow guide first surface 380 and diverging airflow guide second surface 382. Stated differently, in such examples, and as shown in FIG. 5, diverging airflow guide first surface 380 and diverging airflow guide second surface 382 refer to opposite sides and/or surfaces of diverging airflow guide wall 384. In some examples, diverging airflow guide wall 384 is troughed and/or U-shaped transverse to diverging airflow guide radial axis 326 and forms and/or terminates in a pair of diverging airflow guide wall edges 385, which define an open upper face of diverging airflow channel 372. In some examples, diverging airflow guide wall 384 is curved and/or tilted upwardly in downstream direction 318 along diverging airflow guide radial axis 326 and defines a cutout depth 390, which is measured analogously to cutout depth of converging airflow guide 312. In some examples, converging airflow guide walls 378 are continuous with diverging airflow guide walls 384. In some examples, converging airflow guide walls 378 and diverging airflow guide walls 384 collectively form undulating wall 340.

Turning now to FIGS. 6-9, illustrative, non-exclusive examples of mix manifolds 200 and/or airflow interleavers 300 are illustrated. Where appropriate, the reference numerals from the schematic illustrations of FIGS. 2-5 are used to designate corresponding parts in FIGS. 6-9; however, the examples of FIGS. 6-9 are non-exclusive and do not limit airflow interleavers 300 and/or mix manifolds 200 to the illustrated embodiments of FIGS. 6-9. That is, mix manifolds 200 and/or airflow interleavers 300 are not limited to the specific embodiments of that illustrated in FIGS. 6-9, and mix manifolds 200 and/or airflow interleavers 300 may incorporate any number of the various aspects, configurations, characteristics, properties, etc. that are illustrated in and discussed with reference to the schematic representations of FIGS. 2-5 and/or the embodiments of FIGS. 6-9, as well as variations thereof, without requiring the inclusion of all such aspects, configurations, characteristics, properties, etc. Each previously discussed component, part, portion, aspect, region, etc. or variants thereof may not be discussed, illustrated, and/or labeled again with respect to FIGS. 6-9; however, it is within the scope of the present disclosure that the previously discussed features, variants, etc. may be utilized with FIGS. 6-9.

Figure 6:
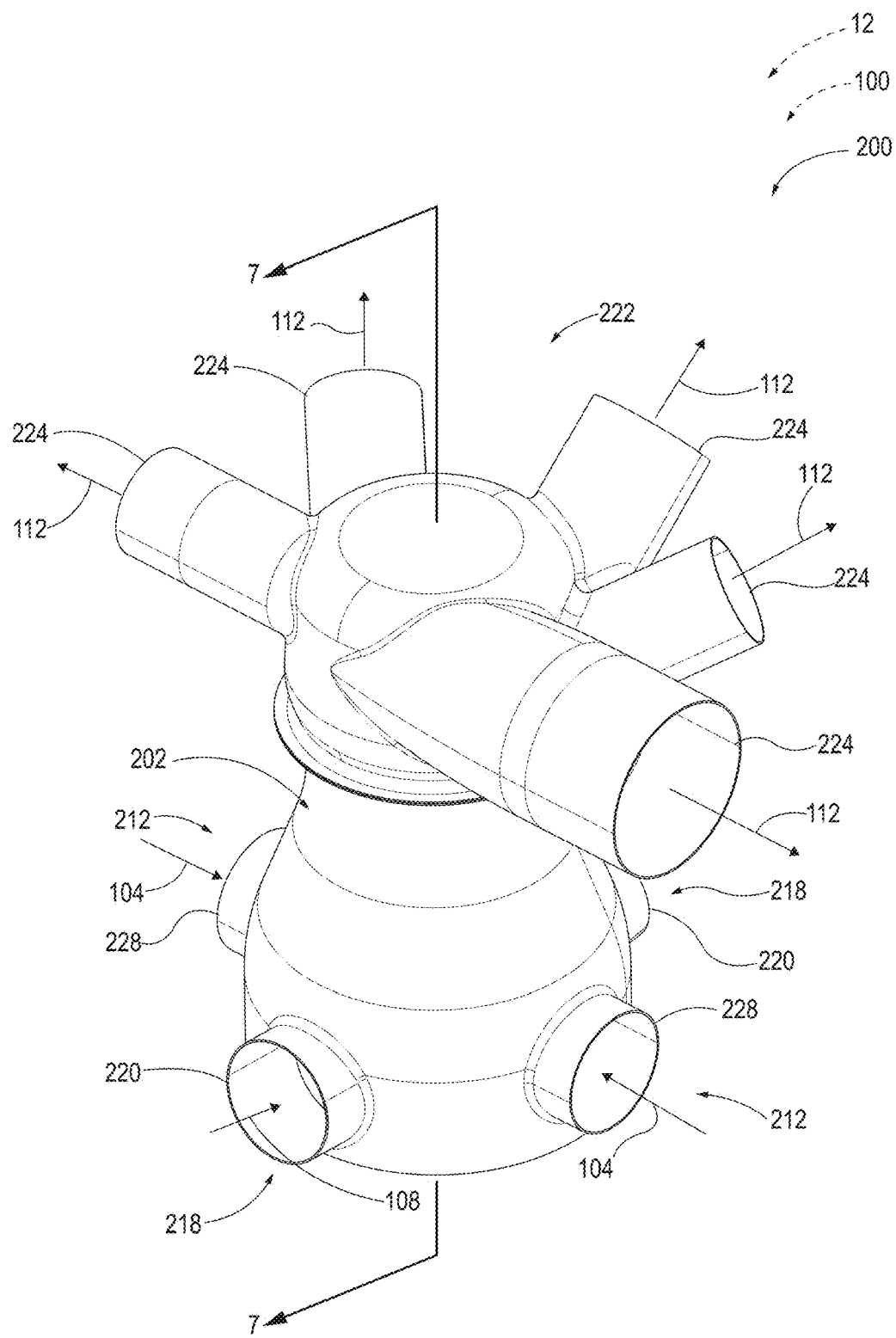
FIG. 6 is an isometric view of an example mix manifold according to the present disclosure.
Figure 7:
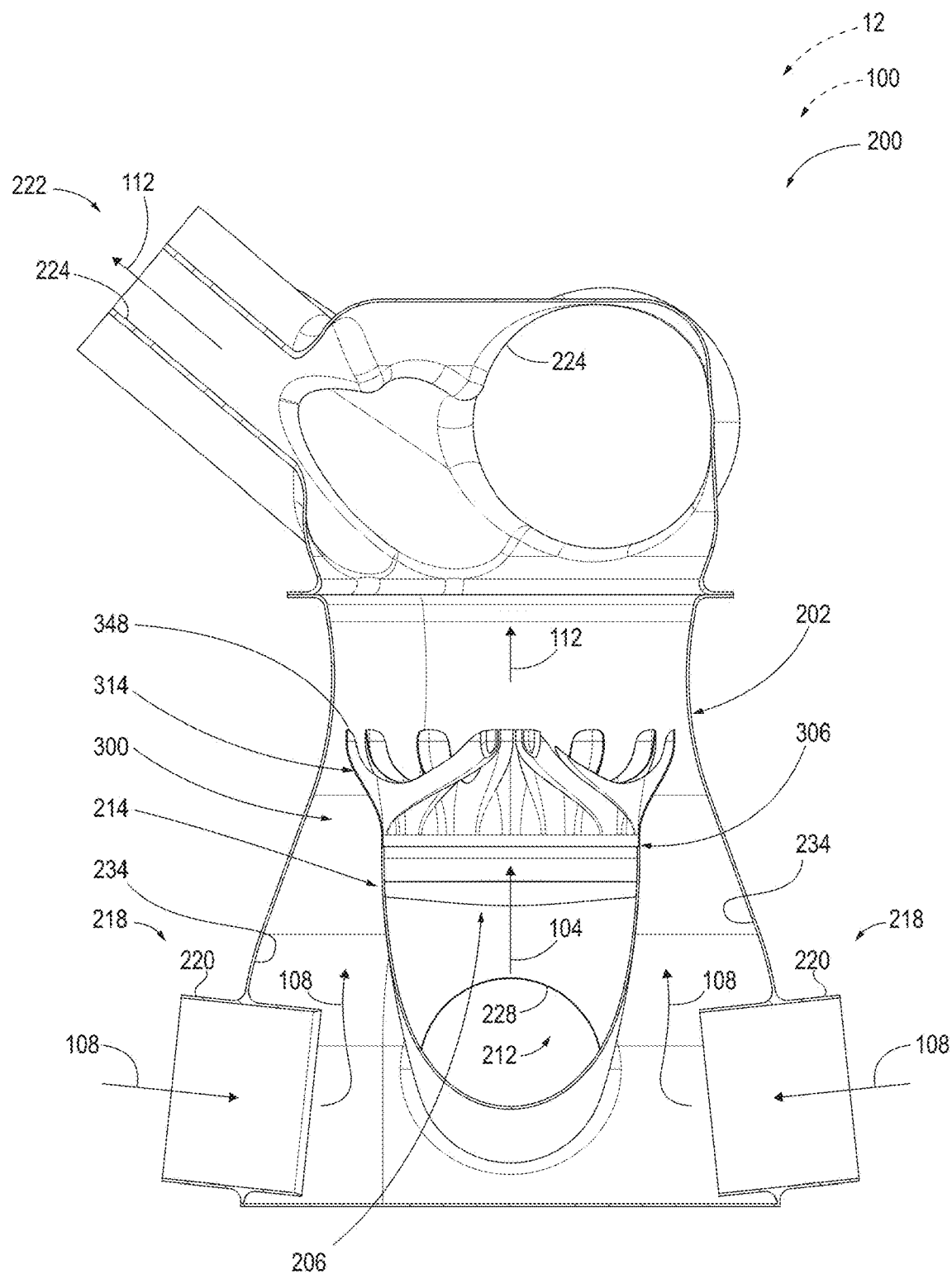
FIG. 7 is a cross-sectional view of the example mix manifold of FIG. 6 taken along line 7-7 shown in FIG. 6.

FIG. 6 is an isometric view illustrating an example mix manifold 200 according to the present disclosure. In the example of FIG. 6, mix manifold 200 includes mixing chamber 202, first airflow intake 212 configured to supply first airflow 104 to mixing chamber 202, second airflow intake 218 configured to supply second airflow 108 to mixing chamber 202, and mixed airflow output 222 configured to receive mixed airflow 112 from mixing chamber 202. In the example of FIG. 6, first airflow intake 212 includes a pair of first airflow ports 228 extending through the sidewall of mixing chamber 202 and into first airflow supply conduit 214 positioned therein, as shown in FIG. 7. In the example of FIG. 6, second airflow intake 218 includes a pair of second airflow inlets 220 that extend through the sidewall of mixing chamber 202. In the example of FIG. 6, mixed airflow output 222 includes a plurality of mixed airflow outlets 224, with each mixed airflow outlet 224 extending from mixing chamber 202. In the example of FIG. 6, one or more mixed airflow outlets 224 are of different sizes, such that each mixed airflow outlet 224 may be configured to supply mixed airflow 112 to a plurality of distinct spaces within aircraft 12 of varied volume and/or with a different velocity of mixed airflow 112.

FIG. 7 is a cross-sectional view of the example mix manifold 200 of FIG. 6 as taken along the line 7-7 shown in FIG. 6. As shown, first airflow supply conduit 214 extends within mixing chamber 202 and supports airflow interleaver 300 at a desired location therein. First airflow ports 228 and first zone 206 of mixing chamber 202 are isolated from direct fluid communication with second zone by first airflow supply conduit 214. Mixing chamber interior surface 234 is venturi-shaped and tapers to a minimum radius proximate outermost axial extent 348 of diverging airflow guides 314 such as to force second airflow 108 through airflow interleaver 300 and/or into converging airflow channels 370. Tubular body 306 is continuous with first airflow supply conduit 214, such that tubular body 306 surrounds a downstream end of first zone 206.

Figure 8:
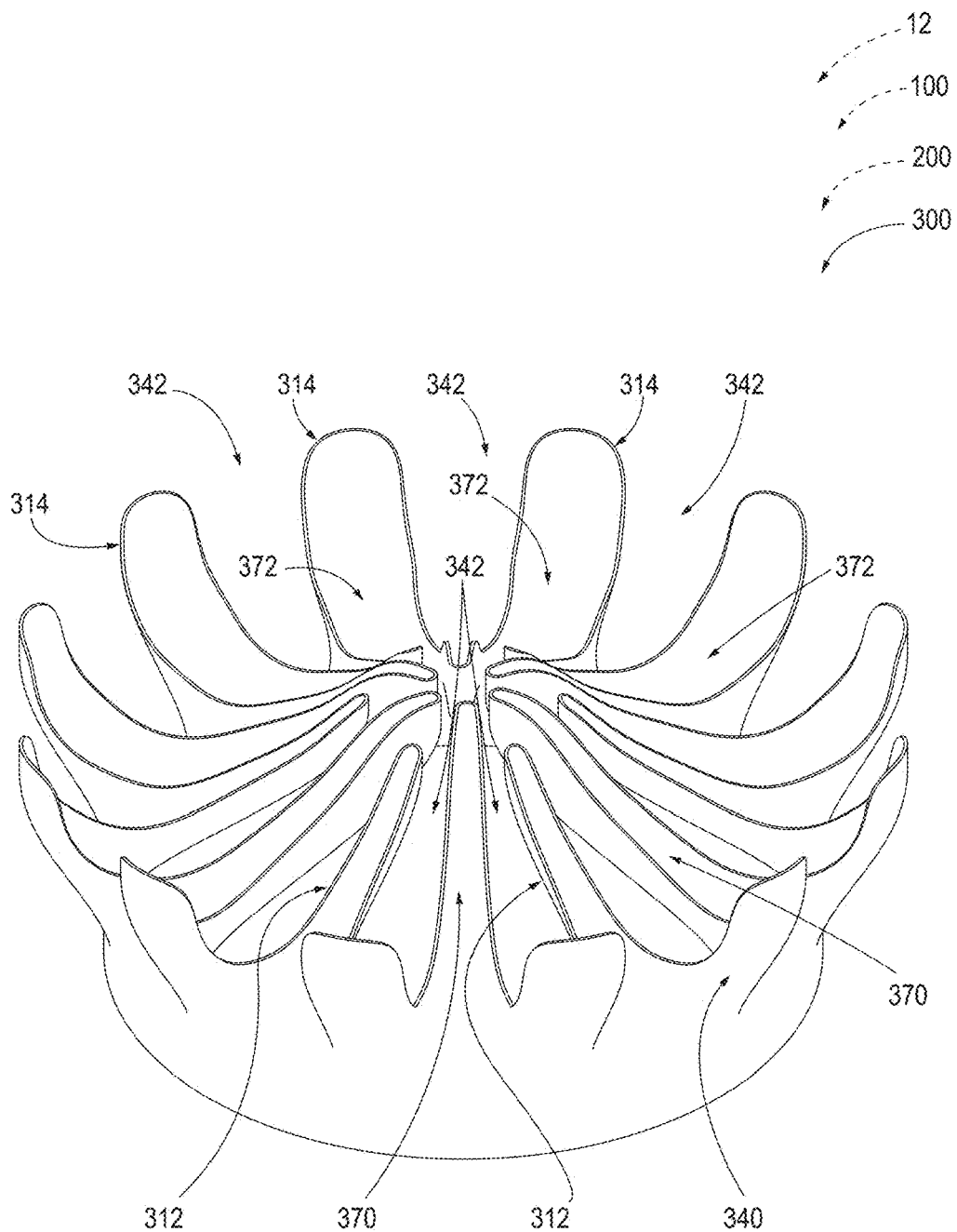
FIG. 8 is an isometric view of an example airflow interleaver according to the present disclosure.

FIG. 8 is an isometric view of an example airflow interleaver 300 according to the present disclosure. As shown, converging airflow guides 312 define a plurality of inter-guide voids 342 that separate adjacent converging airflow guides 312 from one another. Similarly, diverging airflow guides 314 define a plurality of inter-guide voids 342 that separate adjacent diverging airflow guides 314 from one another. Each converging airflow guide 312 defines a converging airflow channel 370 that is azimuthally aligned with an inter-guide void 342 formed between the two diverging airflow guides 314 that are adjacent the converging airflow guide 312. Similarly, each diverging airflow guide 314 defines a diverging airflow channel 372 that is azimuthally aligned with an inter-guide void 342 formed between the two converging airflow guides 312 that are adjacent the diverging airflow guide 314. Here, airflow interleaver 300 includes undulating wall 340 that forms each diverging airflow guide 314 and each converging airflow guide 312 and that defines converging airflow channels 370 and diverging airflow channels 372 thereof.

Figure 9:
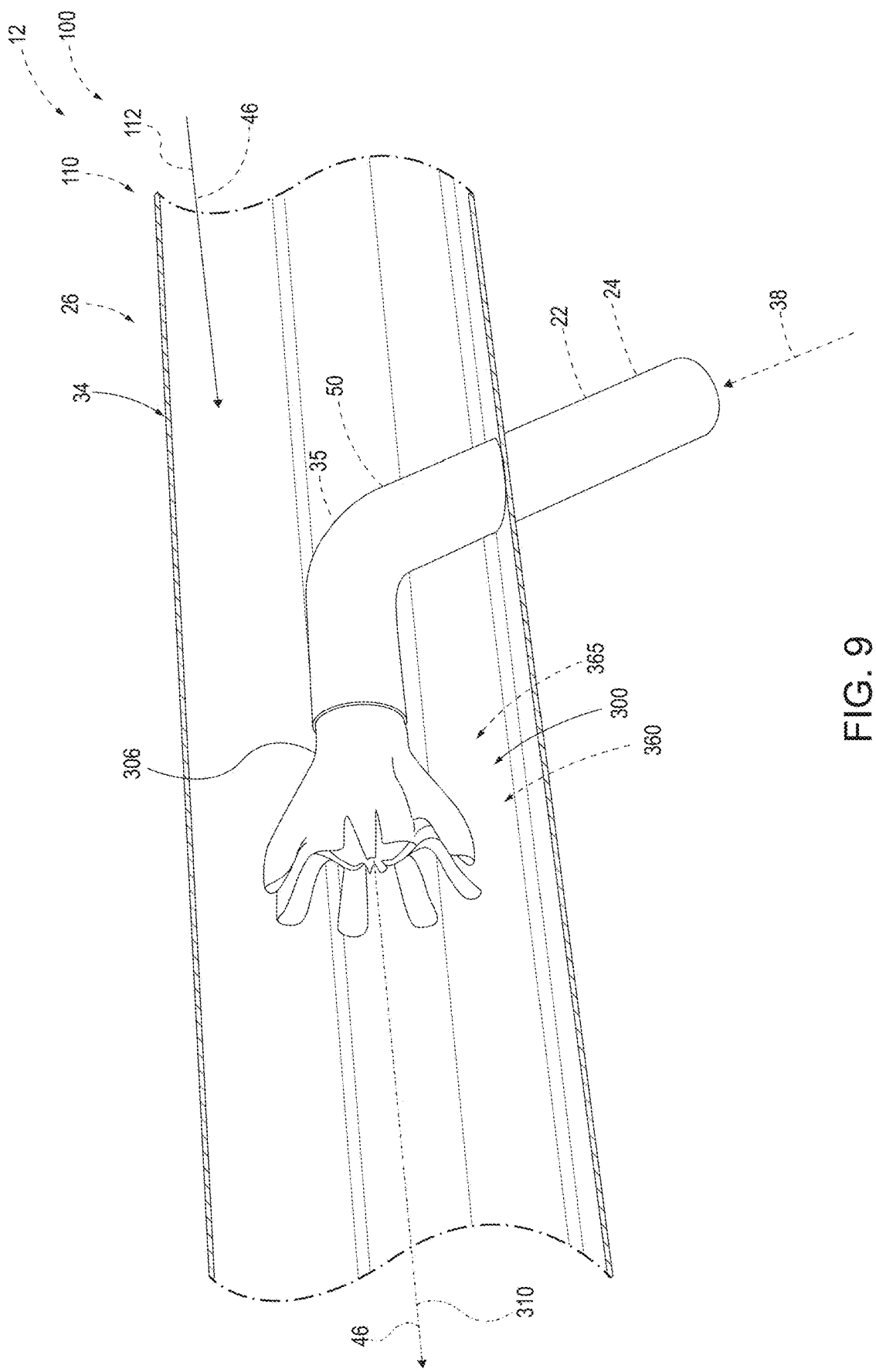
FIG. 9 is a partial cutaway view showing another example airflow interleaver disposed within a duct according to the present disclosure.

FIG. 9 is a cutaway view of an example airflow interleaver 300 operably positioned within a duct 34 according to the present disclosure. As shown, duct 34 defines ducting central axis 46, and airflow interleaver 300 is positioned within duct 34 such that interleaver axis 310 of airflow interleaver is aligned with ducting central axis 46. In particular, tubular body 306 of airflow interleaver 300 is operably coupled to, and in fluid communication with, an airflow supply duct 35 that extends within duct 34 and that is configured to channel an airflow into duct 34. In particular, airflow interleaver 300 defines an inlet of airflow supply duct 35, such that airflow supply duct 35 supplies the airflow to the open central region 308 defined by tubular body 306. Duct 34 is configured to channel a different airflow than the airflow channeled by airflow supply duct 35, and airflow interleaver 300 is configured to form a mixture of the airflow channeled by duct 34 and the airflow channeled to within tubular body 306 by airflow supply duct 35. In some examples, the example airflow interleaver 300 shown in FIG. 9 is included in and/or utilized with environmental control systems 100 illustrated and discussed herein with reference to FIG. 2 as cabin airflow interleaver 360. In some such examples, airflow supply duct 35 is trim airflow supply conduit 50 of cabin trim airflow supply duct 22 configured to channel trim airflow 38 and duct 34 is included in mixed airflow ducting 110 and configured to channel mixed airflow 112. Additionally or alternatively, in some examples, the example airflow interleaver 300 of FIG. 9 is included in and/or utilized with environmental control systems 100 as flight compartment airflow interleaver 365. In some such examples, airflow supply duct 35 is trim airflow supply conduit 50 of flight compartment trim airflow supply duct 24 configured to channel trim airflow 38 and duct 34 is included in flight compartment airflow ducting 26 and configured to channel conditioned airflow 42.

Figure 10:
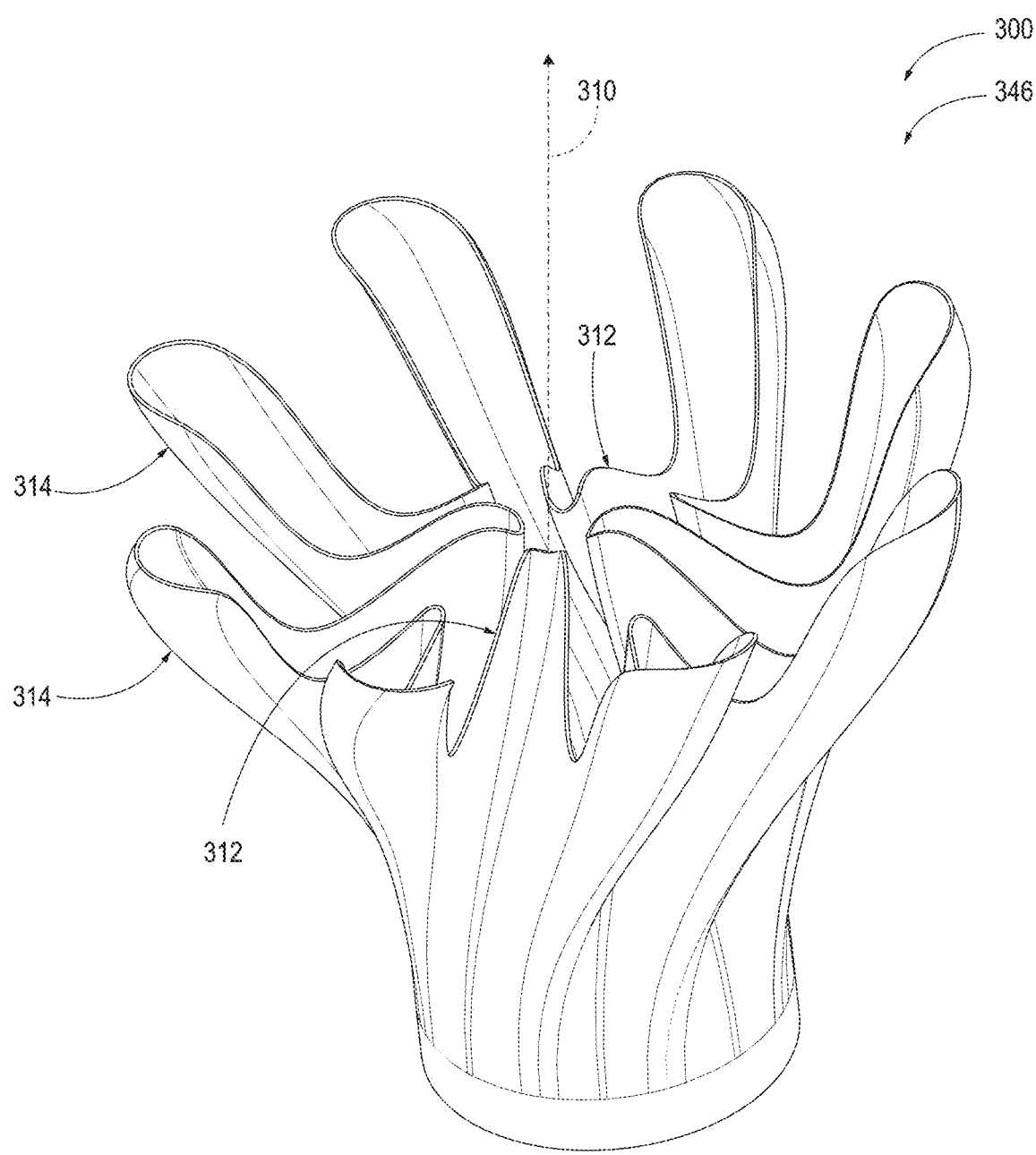
FIG. 10 is an isometric view showing yet another example airflow interleaver according to the present disclosure.

FIG. 10 is an isometric view illustrating another example airflow interleaver 300 according to the present disclosure. In particular, FIG. 10 illustrates an example airflow interleaver 300 that includes spin-inducing conformation 346. As shown, each converging airflow guide 312 extends along and defines a curved converging airflow guide radial axis 324, and each diverging airflow guide 314 extends along and defines a curved diverging airflow guide radial axis 326. Also as shown in this example, each converging airflow guide 312 defines a converging airflow channel 370 that is tilted relative to interleaver axis 310 and is tilted relative to a plane perpendicular to interleaver axis 310. Similarly, each diverging airflow guide 314 defines a diverging airflow channel 372 that is tilted relative to interleaver axis 310 and a plane perpendicular to interleaver axis 310.

Figure 11:
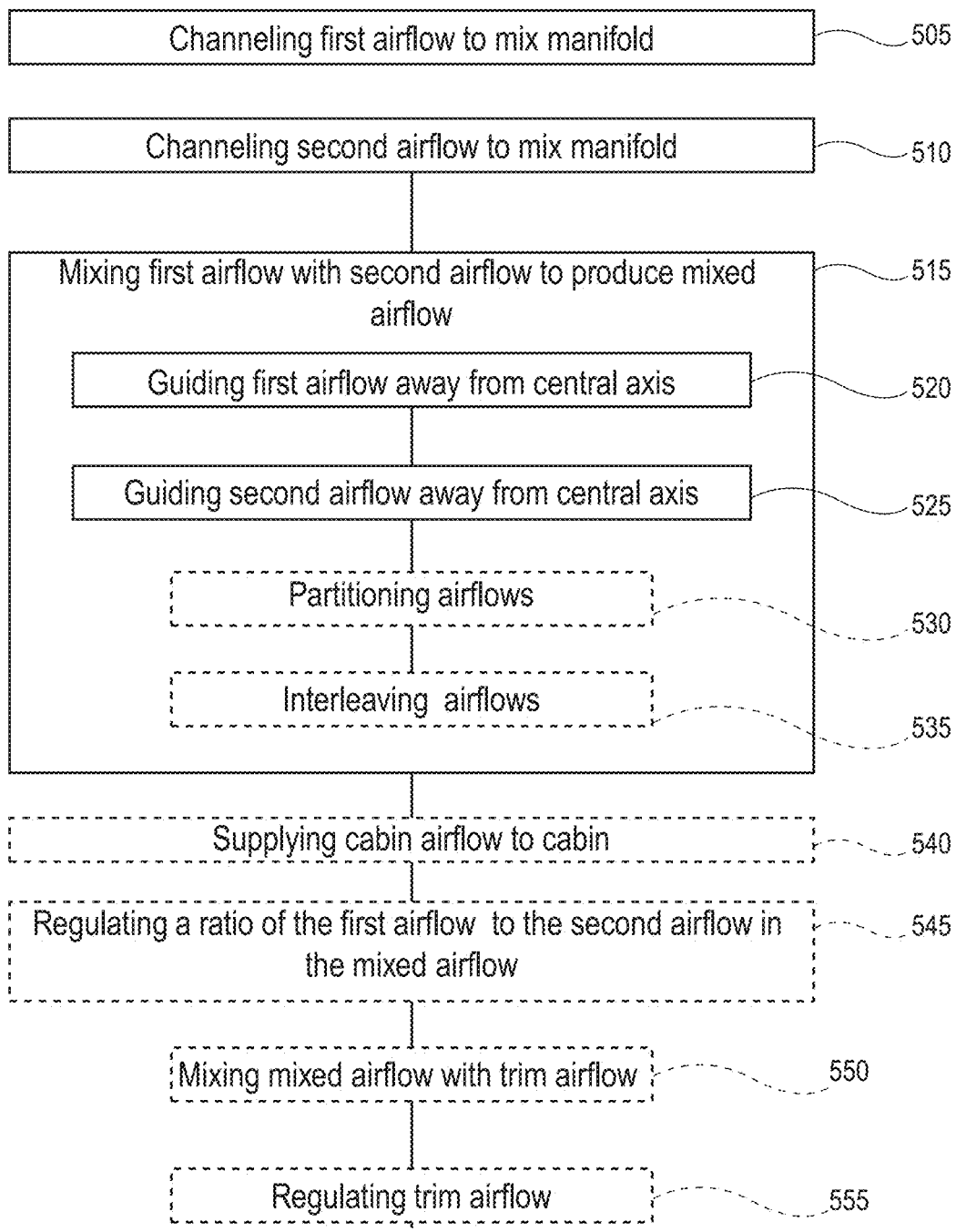
FIG. 11 is a flowchart schematically representing examples of methods according to the present disclosure.

FIG. 11 provides a flowchart that represents illustrative, non-exclusive examples of methods 500 according to the present disclosure. In FIG. 11, some steps are illustrated in dashed boxes indicating that such steps may be optional or may correspond to an optional version of methods 500 according to the present disclosure. That said, not all methods 500 according to the present disclosure are required to include each of the steps illustrated in solid boxes. The methods and steps illustrated in FIG. 11 are not limiting, and other methods and steps are within the scope of the present disclosure, including methods having greater than or fewer than the number of steps illustrated, as understood from the discussions herein.

Methods 500 may be performed utilizing environmental control systems 100, mix manifolds 200, and/or one or more airflow interleavers 300 that are illustrated and discussed herein with reference to FIGS. 2-10. In particular, environmental control systems 100, mix manifolds 200 and/or airflow interleavers 300 may incorporate any of the features, functions, components, etc., as well as variants thereof, as those discussed herein with reference to FIGS. 2-10 without requiring the inclusion of all such features functions, components, etc. Likewise, environmental control systems 100, mix manifolds 200, and/or airflow interleavers 300 may incorporate any of the features, functions, components, etc., as well as variants thereof, as those discussed herein with reference to FIG. 11 and methods 500 without requiring the inclusion of all such features, functions, components, etc. In some examples, one or more steps of methods 500 are performed by controller 60 of environmental control systems 100, such as in a manner discussed herein. In some examples, methods 500 are methods of regulating airflow within an aircraft 12. In some more specific examples, methods 500 are methods of controlling a temperature of a cabin 30 of the aircraft 12.

As shown in FIG. 11, methods 500 include channeling a first airflow 104 to a mix manifold 200 at 505, channeling a second airflow 108 to the mix manifold 200 at 510, and mixing the first airflow 104 with the second airflow 108 within a mixing chamber 202 to produce a mixed airflow 112 at 515. The mixing at 515 includes guiding the first airflow 104 away from a central axis 226 of mixing chamber 202 at 520 and guiding the second airflow 108 towards the central axis 226 at 525. The mixing at 515 optionally includes partitioning each of the first airflow 104 and the second airflow 108 at 530 and interleaving the first airflow 104 with the second airflow 108 at 535. Methods 500 optionally include supplying a cabin airflow 44 to a cabin 30 of the aircraft at 540, regulating a ratio of the first airflow 104 to the second airflow 108 in the mixed airflow 112 at 545, mixing the mixed airflow 112 with a trim airflow 38 at 550, and/or regulating the trim airflow at 555.

In some examples, the channeling the first airflow 104 at 505 includes channeling the first airflow 104 from the cabin 30 of the aircraft 12 to the mix manifold 200. In some examples, the channeling the first airflow 104 at 505 includes channeling the first airflow 104 through the first airflow ducting 102, utilizing one or more circulation fans 32 to draw the first airflow 104 from the cabin 30, channeling the first airflow 104 to a first airflow intake 212 of the mix manifold 200, and/or channeling first airflow 104 to the first zone 206 of mixing chamber 202, such as in a manner discussed herein. In some examples, the channeling at 505 includes channeling the first airflow 104 from a plurality of spaced apart outlets, each being in fluid communication a different region of cabin 30.

The channeling the second airflow 108 at 505 includes channeling the second airflow 108 from an air cycle machine 16 to the mix manifold 200. In some examples, the channeling the second airflow 108 at 505 includes channeling the second airflow 108 through the second airflow ducting 106, pressurizing and/or increasing a velocity of the second airflow 108 with the one or more air cycle machines 16, channeling the second airflow 108 to the second airflow intake 218 of the mix manifold 200, and/or channeling second airflow 108 to the second zone 208 of the mixing chamber 202, such as in a manner discussed herein. In some examples, the channeling the second airflow 108 at 505 includes channeling the second airflow 108 from a plurality of air cycle machines 16, such as in a manner discussed herein.

The channeling the first airflow 104 at 505 and the channeling the second airflow 108 at 510 may be performed with any suitable sequence or timing within methods 500, such as relative to one another and/or relative to one or more other steps of methods 500. For example, in some examples, the channeling the first airflow 104 at 505 and the channeling the second airflow 108 at 510 are performed at least partially simultaneously with one another. Additionally or alternatively, in some examples, each of the channeling the first airflow 104 at 505 and the channeling the second airflow 108 at 510 is performed at least partially simultaneously with at least one other step of methods 500, at least partially prior to at least one other step of methods 500, and/or at least partially subsequent to at least one other step of methods 500.

As discussed, methods 500 further include mixing, within the mix manifold 200, the first airflow 104 with the second airflow 108 to produce the mixed airflow 112 at 515. The mixing at 515 includes utilizing an airflow interleaver 300 positioned within the mixing chamber 202 of the mix manifold 200 to mix the first airflow 104 with the second airflow 108. In some examples, the mixing at 515 includes channeling the first airflow 104 from the first zone 206 of the mixing chamber 202 to a third zone 210 of the mixing chamber 202 and/or channeling the second airflow 108 from the second zone 208 of the mixing chamber 202 to the third zone 210 of the mixing chamber 202, such as in a manner discussed herein. In some examples, the mixing at 515 includes forcing the second airflow 108 through the airflow interleaver 300, such as with the venturi-shaped mixing chamber interior surface 234 discussed herein. In some examples, the mixing at 515 includes producing the mixed airflow 112 with a linear flow pattern and/or mixing the first airflow 104 with the second airflow 108 without imparting spin or vortexing on the mixed airflow 112.

In some examples, the mixing at 515 includes facilitating rapid thermal equilibration of the first airflow 104 and the second airflow 108, such as when the temperature of the first airflow 104 is different from the temperature of the second airflow 108. In some such examples, the mixing at 515 includes producing the mixed airflow 112 with a temperature that is between the temperature of the first airflow 104 and the temperature of the second airflow 108, such as discussed herein. In some such examples, the mixing at 515 includes producing the mixed airflow 112 with a threshold maximum temperature variation in the mixed airflow 112 such as discussed herein.

As discussed, and as shown in FIG. 11, the mixing at 515 includes guiding, with the airflow interleaver 300, the first airflow 104 away from a central axis 226 of the mixing chamber 202 at 520, and guiding, with the airflow interleaver 300, the second airflow 108 towards the central axis 226 of the mixing chamber 202 at 525. In some examples, the guiding at 520 includes guiding the first airflow 104 with the second airflow guide structure 304 of the airflow interleaver 300 and/or with the plurality of diverging airflow guides 314 of the airflow interleaver 300, such as in a manner discussed herein. In some examples, the guiding at 520 includes guiding the first airflow 104 towards the diverging airflow guides 314 with a plurality of inter-guide voids 342 defined by the plurality of converging airflow guides 312 of the airflow interleaver 300, such as in a manner discussed herein. In some examples, the guiding at 525 includes guiding the second airflow 108 with the first airflow guide structure 302 of the airflow interleaver 300 and/or with the plurality of converging airflow guides 312 of the airflow interleaver 300 such as in a manner discussed herein. In some examples, the guiding at 525 includes guiding the second airflow 108 towards the converging airflow guides 312 with a plurality of inter-guide voids 342 defined by the plurality of diverging airflow guides 314. In some examples, the airflow interleaver 300 is the mix manifold airflow interleaver 350, such as in a manner discussed herein.

In some examples, the mixing at 515 further includes partitioning the first airflow 104 into a plurality of first airflow streams and partitioning the second airflow 108 into a plurality of second airflow streams at 530. In some examples, the partitioning at 530 includes partitioning the first airflow 104 with the first airflow guide structure 302 and/or with the converging airflow guides 312 such as in a manner discussed herein. Additionally or alternatively, the partitioning at 530 comprises channeling the plurality of first airflow streams with the plurality of inter-guide voids 342 defined by the converging airflow guides 312 such as in a manner discussed herein. In some examples, the partitioning at 530 includes partitioning the second airflow 108 with the second airflow guide structure 304 and/or with the diverging airflow guides 314 such as in a manner discussed herein. Additionally or alternatively, in some examples, the partitioning at 530 comprises channeling the plurality of second airflow streams with the plurality of inter-guide voids 342 defined by the diverging airflow guides 314 such as in a manner discussed herein.

In some examples, the mixing at 515 further includes interleaving, with the airflow interleaver 300, the plurality of first airflow streams with the plurality of second airflow streams to produce the mixed airflow 112 at 535. In some examples, the interleaving at 535 includes guiding, with the converging airflow guides 312, the plurality of second airflow streams towards the central axis 226, and guiding, with the diverging airflow guides 314, the plurality of first airflow streams away from the central axis 226. In some examples, the interleaving at 535 includes guiding, with the airflow interleaver 300, each first airflow stream of the plurality of first airflow streams to flow between two adjacent second airflow streams of the plurality of airflow streams and/or guiding, with the airflow interleaver 300, each second airflow stream of the plurality of second airflow streams to flow between two adjacent first airflow streams of the plurality of first airflow streams, such as discussed herein.

The mixing at 515, and/or the sub-steps thereof, are performed with any suitable sequence or timing within methods 500. As examples, the mixing at 515 is performed subsequent to and/or at least substantially simultaneously with the channeling at 505. Additionally or alternatively, the mixing at 515 is performed subsequent to and/or at least substantially simultaneously with the channeling at 510. In some examples, the mixing at 515 is performed prior to and/or at least substantially simultaneously with the regulating at 545, the mixing at 550 and/or the regulating at 555.

In some examples, and as discussed, methods 500 include supplying a cabin airflow 44 to the cabin 30 of the aircraft 12 at 540. As discussed herein, cabin airflow 44 includes mixed airflow 112 and optionally includes one or more additional airflows, such as trim airflow 38. Accordingly, the supplying at 540 includes supplying the mixed airflow 112 from the mix manifold 200 to the cabin 30 of aircraft 12. In some examples, the supplying at 540 includes receiving the mixed airflow 112 from the mixed airflow output 222 of the mix manifold 200 and supplying the mixed airflow 112 to at least one inlet in fluid communication with the cabin 30, and optionally a plurality of spaced apart inlets in fluid communication with various locations within cabin 30 such as discussed herein. In some examples, the supplying at 540 includes supplying the mixed airflow 112 through mixed airflow ducting 110, such as with at least one duct 34 of mixed airflow ducting 110, and optionally with a plurality of ducts 34 of mixed airflow ducting 110.

In some examples, and as discussed, methods 500 include regulating a ratio of the first airflow 104 to the second airflow 108 in the mixed airflow 112 at 545. In some examples, the regulating at 545 includes regulating the ratio of the first airflow 104 to the second airflow 108 in the cabin airflow 44 such as discussed herein. In some examples, the regulating the ratio of the first airflow 104 to the second airflow 108 includes controlling the temperature of the mixed airflow 112 and/or controlling the temperature of the cabin airflow 44. As mentioned, in some examples, the temperature of the first airflow 104 is greater than the temperature of the second airflow 108, such that regulating the ratio of the first airflow 104 and to the second airflow 108 controls the temperature of the mixed airflow 112 and/or the cabin airflow 44. In some examples, the regulating at 545 includes, or is performed as a portion of, controlling the temperature of at least a portion of the cabin 30. In some examples, the regulating at 545 includes controlling at least one circulation fan 32 to regulate the first airflow 104 and/or controlling at least one air cycle machine 16 to regulate the second airflow 108.

In some examples, the regulating at 545 includes detecting a temperature of the cabin airflow 44 and regulating the ratio of the first airflow 104 to the second airflow 108 based, at least in part, upon the detected temperature of the cabin airflow 44. In some examples, the detecting the temperature of the cabin airflow 44 includes receiving cabin airflow temperature signals 63 from at least one cabin airflow temperature sensor 62 configured to detect the temperature of the cabin airflow 44. In some examples, the regulating at 545 includes increasing the ratio of the first airflow 104 to the second airflow 108 in the mixed airflow 112 when the temperature of the cabin airflow 44 is less than a threshold minimum of a target cabin airflow temperature range. In some examples, the regulating at 545 includes decreasing the ratio of the first airflow 104 to the second airflow 108 when the cabin airflow temperature is greater than a threshold maximum of the target cabin airflow temperature range. In some examples, increasing the ratio of the first airflow 104 to the second airflow 108 operates to increase the temperature of the cabin airflow 44 and/or the temperature of at least a portion of the cabin 30. Similarly, in some examples, and decreasing the ratio of the first airflow 104 to the second airflow 108 operates to decrease the temperature of the cabin airflow 44 and/or at least a portion of the cabin 30. In some examples, the regulating at 545 includes maintaining the ratio of the first airflow 104 to the second airflow 108 at a target ratio, such as to maintain the temperature of the cabin airflow 44 within the target cabin airflow temperature range.

In more specific examples, the regulating at 545 includes increasing the flow rate of the first airflow 104, and/or increasing a ratio of the flow rate of the first airflow 104 to a flow rate of the second airflow 108, when the temperature of the cabin airflow 44 is less than the threshold maximum of the target cabin airflow temperature range. In some such examples, the increasing the flow rate of the first airflow 104 and/or increasing the ratio of the flow rate of the first airflow 104 to the second airflow 108 includes increasing an output power of the one or more circulation fans 32. Additionally or alternatively, the regulating at 545 includes increasing the flow rate of the second airflow 108 and/or decreasing the ratio of the flow rate of the first airflow 104 to the flow rate of the second airflow 108 when the temperature of the cabin airflow 44 is less than the threshold minimum of the target cabin airflow temperature range, which, in some such examples, includes increasing the output power of the one or more air cycle machines 16.

With continued reference to FIG. 11, in some examples, methods 500 include mixing the mixed airflow 112 with the trim airflow 38 at 550. In some examples, the mixing at 550 is included in, or performed as a portion of, producing the cabin airflow 44. When included, the mixing at 550 includes channeling trim airflow 38 from at least one engine assembly 14, and optionally from a plurality of engine assemblies 14, to within the mixed airflow 112. In some examples, the mixing at 550 includes channeling the trim airflow 38 through at least one cabin trim airflow supply duct 22 to within the mixed airflow ducting 110 and/or at least one duct 34 thereof such as discussed herein.

In some examples, the mixing at 550 includes mixing the mixed airflow 112 with the trim airflow 38 with an airflow interleaver 300. In some examples, the airflow interleaver 300 is positioned within a duct 34 of mixed airflow ducting 110 and is referred to herein as a cabin airflow interleaver 360. Thus, in some examples, the mixing at 550 comprises utilizing the cabin airflow interleaver 360 as discussed herein.

In some examples in which the mixing at 550 includes mixing with the cabin airflow interleaver 360, the mixing at 550 further includes similar, or at least substantially similar, steps to those discussed herein for the mixing at 515. More specifically, in some examples, the mixing at 550 includes guiding, with the cabin airflow interleaver 360, the trim airflow 38 away from the ducting central axis 46 and/or the interleaver axis 310 and guiding, with the cabin airflow interleaver 360, the mixed airflow 112 towards the ducting central axis 46 and/or the interleaver axis 310. In some such examples, the mixing at 550 includes partitioning, with the cabin airflow interleaver 360, the mixed airflow 112 into a plurality of mixed airflow streams, and partitioning, with the cabin airflow interleaver 360, the trim airflow 38 into a plurality of trim airflow streams, such as in a manner discussed herein. In some such examples, the mixing further includes interleaving, with the cabin airflow interleaver 360, the plurality of trim airflow streams with the plurality of mixed airflow streams, such as to produce the cabin airflow 44.

In some examples, the mixing at 550 includes imparting spin on and/or vortexing the cabin airflow 44 with the cabin airflow interleaver 360. In some such examples, the cabin airflow interleaver 360 includes the spin-inducing conformation 346 that is discussed in more detail herein. In some examples, the imparting spin on the cabin airflow 44 includes forcing entrained water droplets and/or water vapor contained within the mixed airflow 112 to coalesce and/or precipitate on the duct walls of the duct 34 of mixed airflow ducting 110, such as to reduce the water content of the cabin airflow 44. In some such examples, methods 500 further include removing the water from the duct walls of duct 34, such as with one or more drain valves and/or scuppers disposed on duct 34 downstream of cabin airflow interleaver 360.

In some examples, the mixed airflow ducting 110 includes a plurality of ducts 34, each being configured to channel a portion of mixed airflow 112, and trim airflow ducting 20 includes a plurality of cabin trim airflow supply ducts 22, each being configured to supply a portion of the trim airflow 38 to a duct 34 of mixed airflow ducting 110. In some such examples, the environmental control system 100 further includes a plurality of cabin airflow interleavers 360 each being positioned at an intersection of a cabin trim airflow supply duct 22 and a duct 34 of mixed airflow ducting 110 such as discussed herein. In some such examples, the mixing at 550 includes mixing, with the plurality of cabin airflow interleavers 360, the mixed airflow 112 with the trim airflow 38 such as discussed herein.

When included, the mixing at 550 is performed with any suitable sequence or timing within methods 500. In some examples, the mixing at 550 is performed subsequent to or at least substantially simultaneously with the mixing at 515. In some examples, the mixing at 550 is performed prior to or at least substantially simultaneously with the regulating at 555.

As shown in FIG. 11, in some examples, methods 500 include regulating a flow rate of the trim airflow 38 into the mixed airflow 112 at 555. In some examples, the regulating at 555 includes, or is performed as a portion of, controlling the temperature of the cabin airflow 44 and/or controlling the temperature of at least a portion of the cabin 30. In particular, as discussed herein, in some examples, the temperature of the trim airflow 38 is greater than the temperature of the mixed airflow 112. In some examples, the regulating the flow rate of the trim airflow 38 includes detecting the temperature of the cabin airflow 44, which is performed in a similar, or at least substantially similar, manner as that discussed herein form the regulating at 545.

In some examples, the regulating at 555 includes increasing the flow rate of the trim airflow 38 into the mixed airflow 112 when the temperature of the cabin airflow 44 is less than a threshold minimum of the target cabin airflow temperature range. Additionally or alternatively, in some examples, the regulating at 555 includes decreasing the flow rate of the trim airflow 38 into the mixed airflow 112 when the temperature of the cabin airflow 44 is greater than the threshold maximum of the target cabin airflow temperature range. In some examples, the increasing the flow rate of the trim airflow 38 operates to increase the temperature of the cabin airflow 44 and/or of at least a portion of the cabin 30, and the decreasing the flow rate of the trim airflow 38 operates to decrease the temperature of the cabin airflow 44 and/or of at least a portion of the cabin 30. In some examples, the decreasing the flow rate of the trim airflow 38 includes ceasing the flow of the trim airflow 38 into the mixed airflow 112, and/or the increasing the flow rate of the trim airflow 38 includes initiating the flow of the trim airflow into the mixed airflow 112. In some examples, the regulating the flow rate of the trim airflow 38 includes maintaining the flow rate of the trim airflow 38 at a target flow rate to maintain the temperature of the cabin airflow 44 within the target cabin airflow temperature range. In some examples, the regulating at 555 includes actuating at least one, and optionally a plurality of, trim airflow valves 36 that are configured to control the flow rate of trim airflow 38 into mixed airflow 112.

When included, the regulating at 555 is performed with any suitable sequence or timing within methods 500. In some examples, the regulating at 555 is performed as at least substantially simultaneously with or subsequent to the mixing at 550. Additionally or alternatively, in some examples, the mixing at 555 is performed prior to or at least substantially simultaneously with the mixing at 550.

Illustrative, non-exclusive examples of inventive subject matter according to the present disclosure are described in the following enumerated paragraphs:

A1. An environmental control system (100) for regulating airflow within an aircraft (12), the environmental control system (100) comprising:

a mix manifold (200) comprising a mixing chamber (202) defining a central axis (226) that extends therethrough, wherein the mix manifold (200) is configured to receive a first airflow (104) and a second airflow (108); and an airflow interleaver (300) disposed within the mixing chamber (202), wherein the airflow interleaver (300) comprises a first airflow guide structure (302) configured to guide the second airflow (108) towards the central axis (226) and a second airflow guide structure (304) configured to guide the first airflow (104) away from the central axis (226) to facilitate mixing of the first airflow (104) and the second airflow (108) to produce a mixed airflow (112) therefrom.

A2. The environmental control system (100) of paragraph A1, wherein the mix manifold (200) receives the first airflow (104) from a cabin (30) of the aircraft (12), and wherein the mix manifold (200) receives the second airflow (108) from an air cycle machine (16) of the aircraft (12).

A2.1 The environmental control system (100) of paragraph A2, further comprising a circulation fan (32) configured to move the first airflow (104) from the cabin (30) of the aircraft (12) to the mix manifold (200).

A2.2 The environmental control system (100) of any of paragraphs A2-A2.1, wherein the air cycle machine (16) is in fluid communication with an engine assembly (14) of the aircraft (12), wherein the air cycle machine (16) is configured to receive a bleed airflow (37) from the engine assembly (14) and to condition the bleed airflow (37) to produce the second airflow (108) from the bleed airflow (37).

A2.3 The environmental control system (100) of any of paragraphs A2-A2.2, wherein the air cycle machine (16) is one of a plurality of air cycle machines (16) each being configured to supply a respective portion of the second airflow (108) and collectively being configured to supply the second airflow (108).

A3. The environmental control system (100) of any of paragraphs A1-A2, wherein the mixed airflow (112) is supplied to a/the cabin (30) of the aircraft (12).

A4. The environmental control system (100) of any of paragraphs A1-A3, wherein the first airflow (104) has a temperature that is greater than a temperature of the second airflow (108), and wherein the mixed airflow (112) has a temperature that is less than the temperature of the first airflow (104) and greater than the temperature of the second airflow (108).

A4.1. The environmental control system (100) of paragraph A4, wherein the temperature of the first airflow (104) is greater than the temperature of the second airflow (108) by an airflow temperature differential, and wherein the mix manifold (200) is configured to produce the mixed airflow (112) with a threshold maximum temperature variation in the mixed airflow (112).

A4.1.1. The environmental control system (100) of paragraph A4.1, wherein the airflow temperature differential is one or more of at least 10 degrees Celsius (° C.), at least 15° C., at least 17.5° C., at least 20° C., at least 22.5° C., at least 25° C., at least 30° C., at least 40° C., at least 50° C., at most 25° C., at most 30° C., at most 40° C., at most 50° C., and at most 100° C.

A4.1.2. The environmental control system (100) of any of paragraphs A4.1-A4.1.1, wherein the threshold maximum temperature variation in the mixed airflow (112) is one or more of at least 0.01° C., at most 0.05° C., at most 0.1° C., at most 0.5° C., at most 1° C., at most 1.5° C., at most 2° C., at most 3° C., at most 4° C., and at most 5° C.

A4.1.3. The environmental control system (100) of any of paragraphs A4.1-A4.1.2, wherein the threshold maximum temperature variation in the mixed airflow (112) is at most a threshold fraction of the magnitude of the airflow temperature differential, and wherein the threshold fraction is one or more of at least 0.01%, at least 0.1%, at most 0.1%, at most 0.5%, at most 1%, at most 2%, at most 3%, at most 4%, at most 5%, at most 6%, and at most 10%.

A5. The environmental control system (100) of any of paragraphs A1-A4, further comprising:

a cabin airflow temperature sensor (62) configured to detect a temperature of a cabin airflow (44), wherein the cabin airflow (44) comprises the mixed airflow (112), and a controller (60) configured to receive a cabin airflow temperature signal (63) from the cabin airflow temperature sensor (62) that corresponds to the temperature of the cabin airflow, wherein the controller (60) is programmed to at least partially control operation of the environmental control system (100) to regulate the temperature of the cabin airflow (44) based, at least in part, on the cabin airflow temperature signal (63).

A5.1. The environmental control system (100) of paragraph A5, wherein the controller (60) is programmed to increase a relative proportion of the first airflow (104) supplied to the mix manifold (200) when the temperature of the cabin airflow (44) is less than a threshold minimum of a target cabin airflow temperature range, and wherein the controller (60) is configured to increase a relative proportion of the second airflow (108) supplied to the mix manifold (200) when the cabin airflow temperature is greater than a threshold maximum of the target airflow temperature range.

A5.2. The environmental control system (100) of any of paragraph A5-A5.1, wherein the environmental control system (100) is configured to selectively channel a trim airflow (38) from a/the engine assembly (14) into the mixed airflow (112) downstream of the mix manifold (200), wherein the controller (60) is programmed to regulate a supply of the trim airflow (38) to mixed airflow (112), and wherein the controller (60) is programmed to reduce a flow rate of the trim airflow (38) to the mixed airflow (112) when the temperature of the cabin airflow (44) is greater than a/the threshold maximum of a/the target cabin airflow temperature range, and wherein the controller (60) is programmed to reduce the flow rate of the trim airflow (38) to the mixed airflow (112) when the temperature of the cabin airflow (44) is less than a threshold minimum of the cabin airflow target temperature range.

A5.2.1. The environmental control system (100) of paragraph A5.1, wherein a temperature of the trim airflow (38) is greater than a/the temperature of the mixed airflow (112).

A6. The environmental control system (100) of any of paragraphs A1-A5.2.1, wherein the airflow interleaver (300) is configured to:

(i) partition the first airflow (104) into a plurality of first airflow streams;

(ii) partition the second airflow (108) into a plurality of second airflow streams; and (iii) interleave the plurality of first airflow streams with the plurality of second airflow streams to produce the mixed airflow (112).

A7. The environmental control system (100) of any of paragraphs A1-A6, wherein the airflow interleaver (300) comprises a tubular body (306) that is configured to receive the first airflow (104), wherein the tubular body (306) extends along and defines an interleaver axis (310) that is aligned with the central axis (226).

A8. The environmental control system (100) of paragraph A7, wherein the first airflow guide structure (302) comprises a plurality of converging airflow guides (312) that extend from the tubular body (306) radially towards the interleaver axis (310); and wherein the second airflow guide structure (304) comprises a plurality of diverging airflow guides (314) that extend from the tubular body (306) radially away from the interleaver axis (310).

A8.1. The environmental control system (100) of any of paragraphs A7-A8, wherein the plurality of converging airflow guides (312) is azimuthally interleaved with the plurality of diverging airflow guides (314), wherein the plurality of converging airflow guides (312) is configured to partition the first airflow (104) into a/the plurality of first airflow streams and the plurality of diverging airflow guides (314) is configured to partition the second airflow (108) into a/the plurality of second airflow streams, and wherein the airflow interleaver (300) is configured to interleave the plurality of first airflows (104) with the plurality of second airflows (108) to produce the mixed airflow (112).

A8.2. The environmental control system (100) of any of paragraphs A8-A8.1, wherein the plurality of converging airflow guides (312) comprises a first subset (320) of converging airflow guides (312) and a second subset (322) of converging airflow guides (312), and wherein each converging airflow guide (312) of the first subset (320) of converging airflow guides (312) extends closer to the interleaver axis (310) than does each converging airflow guide (312) of the second subset (322) of converging airflow guides (312).

A9. The environmental control system (100) of any of paragraphs A1-A8.2, wherein the mix manifold (200) comprises a first airflow supply conduit (214) extending within the mixing chamber (202) and configured to supply the first airflow (104) to the mixing chamber (202), wherein the airflow interleaver (300) defines a first airflow inlet (216) of the first airflow supply conduit (214).

A9.1. The environmental control system (100) of paragraph A9, wherein the mixing chamber (202) defines a mixing chamber internal volume (204) that comprises a first zone (206) for receiving the first airflow (104), a second zone (208) for receiving the second airflow (108), and a third zone (210) for producing the mixed airflow (112), and wherein the first airflow supply conduit (214) at least partially surrounds the first zone (206) and at least partially separates the first zone (206) from the second zone (208).

A10. The environmental control system (100) of any of paragraphs A1-A9.1, further comprising:
a first airflow ducting (102) configured to channel a/the first airflow (104);
a second airflow ducting (106) configured to channel a/the second airflow (108); and
a mixed airflow ducting (110) configured to channel a/the mixed airflow (112).

A10.1. The environmental control system (100) of paragraph A10, wherein one or more of:
the first airflow ducting (102) is in fluid communication with a/the cabin (30) and the mix manifold (200);
the second airflow ducting (106) is in fluid communication with an/the air cycle machine (16) and the mix manifold (200); and
the mixed airflow ducting (110) is in fluid communication with the cabin (30) and the mix manifold (200).

A11. The environmental control system (100) of any of paragraphs A1-A10.1, wherein the airflow interleaver (300) is one of a plurality of airflow interleavers (300), and wherein the airflow interleaver is a mix manifold airflow interleaver (350).

A11.1 The environmental control system (100) of paragraph A11, wherein the plurality of airflow interleavers (300) further comprises a cabin airflow interleaver (360) disposed within a duct (34) of a/the mixed airflow ducting (110) that is configured to channel the mixed airflow (112) and defines a ducting central axis (46) extending therethrough, wherein the cabin airflow interleaver (360) is positioned within the mixed airflow ducting (110) at an intersection with a cabin trim airflow supply duct (22) that is configured to channel a/the trim airflow (38) into the mixed airflow (112), wherein the first airflow guide structure (302) of the cabin airflow interleaver (360) is configured to guide the mixed airflow (112) towards the ducting central axis (46) and the second airflow guide structure (304) is configured to guide the trim airflow (38) away from the ducting central axis (46) to facilitate mixing of the mixed airflow (112) with the trim airflow (38) to produce a cabin airflow (44).

A11.2 The environmental control system (100) of paragraph A11.1, wherein the cabin airflow interleaver (360) is configured to induce spin in the cabin airflow (44) to separate condensation from the cabin airflow (44) within the mixed airflow ducting (110).

A11.3. The environmental control system (100) of any of paragraphs A11-A11.2, wherein the plurality of airflow interleavers (300) further comprises a flight compartment airflow interleaver (365) disposed within a duct (34) of a flight compartment airflow ducting (26) that is configured to channel a conditioned airflow (42) and defines a/the ducting central axis (46) therethrough, wherein the flight compartment airflow interleaver (365) is positioned within the duct (34) of the flight compartment airflow ducting (26) at an intersection with a flight compartment trim airflow supply duct (24) that is configured to channel a/the trim airflow (38) into the conditioned airflow (42), wherein the first airflow guide structure (302) of the flight compartment airflow interleaver (365) is configured to guide the conditioned airflow (42) towards the ducting central axis (46) and the second airflow guide structure (304) of the flight compartment airflow interleaver (365) is configured to guide the trim airflow (38) away from the ducting central axis (46) to facilitate mixing of the conditioned airflow (42) with the trim airflow (38).

A12. The environmental control system (100) of any of paragraphs A1-A11.3, further comprising a/the controller (60) configured to perform the method (500) of any of paragraphs D1-D4.1.

A13. The environmental control system (100) of any of paragraphs A1-A12, wherein the mix manifold (200) is the mix manifold (200) of any of paragraphs B1-B8.

A14. The environmental control system (100) of any of paragraphs A1-A13, wherein the airflow interleaver (300) is the airflow interleaver (300) of any of paragraphs C1-C13.4.

A15. An aircraft (12) comprising the environmental control system (100) of any of paragraphs A1-A14.

A15.1. The aircraft (12) of paragraph A15, wherein the aircraft (12) is one or more of a passenger aircraft (12), a fixed-wing aircraft (12), and a commercial aircraft (12).

A16. The use of the environmental control system (100) of any of paragraphs A1-A14 to regulate airflow within an aircraft (12).

B1. A mix manifold (200) configured to mix a first airflow (104) with a second airflow (108) to produce a mixed airflow (112), the mix manifold (200) comprising:
a mixing chamber (202) defining a central axis (226) extending through the mixing chamber (202);
a first airflow intake (212) configured to channel the first airflow (104) to within the mixing chamber (202);

a second airflow intake (218) configured to supply the second airflow (108) to within the mixing chamber (202);

a mixed airflow output (222) configured to receive the mixed airflow (112) from the mixing chamber (202); and an airflow interleaver (300) disposed within the mixing chamber (202), wherein the airflow interleaver (300) comprises a first airflow guide structure (302) configured to guide the second airflow (108) towards the central axis (226) and a second airflow guide structure (304) configured to guide the first airflow (104) away from the central axis (226) to facilitate mixing of the first airflow (104) and the second airflow (108).

B2. The mix manifold (200) of paragraph B1, wherein the mixing chamber (202) defines a mixing chamber internal volume (204) that comprises a first zone (206) for receiving the first airflow (104), a second zone (208) for receiving the second airflow (108), and a third zone (210) for producing the mixed airflow (112).

B2.1. The mix manifold (200) of paragraph B2, wherein the second airflow intake (218) is configured to supply the second airflow (108) to the second zone (208), and wherein the mixed airflow output (222) is configured to receive the mixed airflow (112) from the third zone (210).

B2.2. The mix manifold (200) of any of paragraphs B2-B2.1, wherein the first airflow intake (212) includes a first airflow supply conduit (214) extending within the mixing chamber internal volume (204) and at least partially surrounding the first zone (206), wherein the first airflow supply conduit (214) at least partially separates the first zone (206) from the second zone (208), and wherein the first airflow supply conduit (214) defines a first airflow inlet (216) that is configured to supply the first airflow (104) to the third zone (210).

B2.2.1. The mix manifold (200) of paragraph B2.2, wherein the airflow interleaver (300) defines the first airflow inlet (216) of the first airflow supply conduit (214).

B2.3. The mix manifold (200) of any of paragraphs B2-B2.2.1, wherein the first airflow (104) flows through the first zone (206) in a downstream direction (318), wherein the second airflow (108) flows through the second zone (208) in the downstream direction (318), wherein the first airflow guide structure (302) is positioned immediately adjacent to and immediately downstream of the first zone (206), and wherein the second airflow guide structure (304) positioned is immediately adjacent to and immediately downstream of the second zone (208).

B3. The mix manifold (200) of any of paragraphs B1-B2.3, wherein the mixing chamber (202) defines a mixing chamber interior surface (234) that defines the mixing chamber internal volume (204), and optionally wherein the mixing chamber interior surface (234) is venturi-shaped.

B4. The mix manifold (200) of any of paragraphs B1-B3, wherein the airflow interleaver (300) defines a maximum interleaver radius (336), as measured between the central axis (226) and a point on the airflow interleaver (300) that is maximally distal the central axis (226), wherein the mixing chamber (202) defines a minimum chamber radius (230), as measured between the central axis (226) and a point on the mixing chamber interior surface (234) that is proximal the maximum interleaver radius (336), and wherein the minimum chamber radius (230) is at most a threshold proportion of the maximum interleaver radius (336).

B4.1. The mix manifold (200) of paragraph B4, wherein the threshold proportion is one or more of at least 100%, at least 101%, at least 102%, at least 103%, at least 104%, at least 105%, least 110%, at least 120%, at most 105%, at most 110%, at most 120%, and/or at most 150%.

B5. The mix manifold (200) of any of paragraphs B1-B4.1, wherein the first airflow supply conduit (214) defines a supply conduit open central region (209), wherein the supply conduit open central region (209) defines a supply conduit inner radius (232), as measured between the central axis (226) and a portion of the first airflow supply conduit (214) facing the supply conduit open central region (209), wherein the first airflow guide structure (302) defines a first airflow guide structure innermost radial extent (332), as measured between the central axis (226) and a point on the first airflow guide structure (302) that is nearest to the central axis (226), and wherein the first airflow guide structure innermost radial extent (332) is at most a threshold proportion of the supply conduit inner radius (232) of the supply conduit open central region (209).

B5.1. The mix manifold (200) of paragraph B5, wherein the threshold proportion of the first airflow guide structure innermost radial extent (332) to supply conduit inner radius (232) of the supply conduit open central region (209) is one or more of at most 20%, at most 15%, at most 10%, at most 8%, at most 6%, at most 5%, at most 4%, at most 3% at most 2%, at most 1%, at most 0.5%, at most 0.1%, at most 0.01%, and/or at least 0.01%.

B6. The mix manifold (200) of any of paragraphs B1-B5.1, wherein the first airflow guide structure (302) comprises, and optionally consists of, a plurality of converging airflow guides (312) that extend toward the central axis (226).

B7. The mix manifold (200) of any of paragraphs B1-B6, wherein the second airflow guide structure (304) comprises, and optionally consists of, a plurality of diverging airflow guides (314) that extend away from the central axis (226).

B8. The mix manifold (200) of any of paragraphs B1-B7, wherein the airflow interleaver (300) is the airflow interleaver (300) of any of paragraphs C1-C14.

C1. An airflow interleaver (300), comprising:
a tubular body (306) having an interleaver axis (310) that extends positively in a downstream direction (318);
a plurality of converging airflow guides (312) that extend from the tubular body (306) radially towards the interleaver axis (310); and
a plurality of diverging airflow guides (314) that extend from the tubular body (306) radially away from the interleaver axis (310);
wherein the plurality of converging airflow guides (312) are azimuthally interleaved with the plurality of diverging airflow guides (314), and wherein the plurality of converging airflow guides (312) and the plurality of diverging airflow guides (314) collectively are configured to interleave a plurality of first airflow streams flowing from the tubular body (306) in the downstream direction (318) with a plurality of second airflow streams flowing from a region (400) external to the tubular body (306) in the downstream direction (318) to produce a mixed airflow (112) therefrom.

C2. The airflow interleaver (300) of paragraph C1, wherein the plurality of diverging airflow guides (314) extend in the downstream direction (318), and wherein the plurality of converging airflow guides (312) extend in the downstream direction (318).

C2.1. The airflow interleaver (300) of any of paragraphs paragraph C1-C2, wherein the tubular body (306) bounds an open central region (308) that is configured to channel a first airflow (104), and wherein the interleaver axis (310) extends through the open central region (308).

C3. The airflow interleaver (300) of any of paragraphs C1-C2.1, wherein the airflow interleaver (300) is configured to partition a/the first airflow (104) flowing in the downstream direction (318) through the open central region (308) into the plurality of first airflow streams, and wherein airflow interleaver (300) is configured to partition a second airflow (108) flowing in the downstream direction (318) through the region (400) external the tubular body (306) into the plurality of second airflow streams.

C3.1. The airflow interleaver (300) of paragraph C3, wherein the plurality of converging airflow guides (312) are configured to partition the first airflow (104) into the plurality of first airflow streams, and wherein the plurality of diverging airflow guides (314) are configured to partition the second airflow (108) flowing in the downstream direction (318) through the region (400) external the tubular body (306) into the plurality of second airflow streams.

C4. The airflow interleaver (300) of any of paragraphs C1-C3.1, wherein the plurality of converging airflow guides (312) comprise, and optionally consist of, a first subset (320) of converging airflow guides (312) and a second subset (322) of converging airflow guides (312), and wherein each converging airflow guide (312) of the first subset (320) extends closer to the interleaver axis (310) than does each converging airflow guide (312) of the second subset (322).

C5. The airflow interleaver (300) of any of paragraphs C1-C4, wherein the tubular body (306) defines a tubular body inner radius (334), as measured between the interleaver axis (310) and a portion of the tubular body (306) facing the interleaver axis (310), wherein each converging airflow guide (312) of the plurality of converging airflow guides (312) defines a converging airflow guide innermost radial extent (338), as measured between the interleaver axis (310) and a point on the converging airflow guide (312) that is nearest to the interleaver axis (310), and wherein the converging airflow guide innermost radial extent (338) of one or more converging airflow guides (312) of the plurality of converging airflow guides (312) is less than a converging airflow guide threshold proportion of the tubular body inner radius (334).

C5.1 The airflow interleaver (300) of paragraph C5, wherein the converging airflow guide threshold proportion is one or more of at most 20%, at most 15%, at most 10%, at most 8%, at most 6%, at most 5%, at most 4%, at most 3% at most 2%, at most 1%, at most 0.5%, at most 0.1%, at most 0.01%, and/or at least 0.01%.

C5.2 The airflow interleaver (300) of any of paragraphs C5-C5.1, wherein the converging airflow guide innermost radial extent (338) of at least one converging airflow guide (312) of the plurality of converging airflow guides (312) defines a first airflow guide structure innermost radial extent (332) of a/the first airflow guide structure (302).

C6. The airflow interleaver (300) of any of paragraphs C1-C5.2, wherein the airflow interleaver (300) comprises an undulating wall (340), wherein the undulating wall (340) forms at least a portion of at least one converging airflow guide (312) of the plurality of converging airflow guides (312) and at least a portion of at least one diverging airflow guide (314) of the plurality of diverging airflow guides (314) that is adjacent to the converging airflow guide (312) of the plurality of converging airflow guides (312).

C6.1. The airflow interleaver (300) of paragraph C6, wherein the undulating wall (340) forms each converging airflow guide (312) of the plurality of converging airflow guides (312) and each diverging airflow guide (314) of the plurality of diverging airflow guides (314).

C6.2. The airflow interleaver (300) of paragraph C6.1, wherein the undulating wall is one or more of a single wall, a continuous wall, and an uninterrupted wall.

C7. The airflow interleaver (300) of any of paragraphs C1-C6.2, wherein the plurality of converging airflow guides (312) define a plurality of inter-guide voids (342), and wherein each inter-guide void (342) of the plurality of inter-guide voids (342) extends between and separates a corresponding pair of converging airflow guides (312) of the plurality of converging airflow guides (312).

C8. The airflow interleaver (300) of any of paragraphs C1-C7, wherein each converging airflow guide (312) of the plurality of converging airflow guides (312) extends along and defines a respective converging airflow guide radial axis (324).

C8.1. The airflow interleaver (300) of paragraph C8, wherein each converging airflow guide (312) of the plurality of converging airflow guides (312) defines a respective converging airflow channel (370) that extends along the respective converging airflow guide radial axis (324) and is configured to guide at least a portion of one or more second airflow streams of the plurality of second airflow streams towards the interleaver axis (310).

C9. The airflow interleaver (300) of any of paragraphs C1-C8.1, wherein each converging airflow guide (312) of the plurality of converging airflow guides (312) defines a converging airflow guide first surface (374) and a converging airflow guide second surface (376) that is opposed to the converging airflow guide first surface (374), and wherein at least a portion of the converging airflow guide first surface (374) faces the open central region (308) of the tubular body (306).

C9.1. The airflow interleaver (300) of paragraph C9, when depending from paragraph C8.1, wherein the converging airflow guide second surface (376) of each converging airflow guide (312) at least partially defines the respective converging airflow channel (370).

C10. The airflow interleaver (300) of any of paragraphs C1-C9.1, wherein each diverging airflow guide (314) of the plurality of diverging airflow guides (314) extends along and defines a respective diverging airflow guide radial axis (326).

C10.1. The airflow interleaver (300) of any of paragraph C1-C10, wherein each diverging airflow guide (314) of the plurality of diverging airflow guides (314) defines a respective diverging airflow channel (372) that extends along the respective diverging airflow guide radial axis (326) and is configured to guide at least a portion of one or more first airflow streams of the plurality of first airflow streams away from the interleaver axis (310).

C11. The airflow interleaver (300) of any of paragraphs C1-C10.1, wherein each diverging airflow guide (314) of the plurality of diverging airflow guides (314) defines a diverging airflow guide first surface (380) and a diverging airflow guide second surface (382) that is opposed to the diverging airflow guide first surface (380), and wherein at least a portion of the diverging airflow guide first surface (380) faces the region (400) exterior to of the tubular body (306).

C11.1. The airflow interleaver (300) of paragraph C11, when depending from paragraph C10.1, wherein the diverging airflow guide second surface (382) of each diverging airflow guide (314) of the plurality of diverging airflow guides (314) at least partially defines the respective diverging airflow channel (372).

C12. The airflow interleaver (300) of any of paragraphs C1-C11.1, wherein each converging airflow guide (312) of the plurality of converging airflow guides (312) defines a respective outermost axial extent (348), as measured along a direction parallel to the interleaver axis (310) in the downstream direction (318), wherein each diverging airflow guide (314) of the plurality of diverging airflow guides (314) defines a respective outermost axial extent (348), as measured along a direction parallel to the interleaver axis (310) in the downstream direction (318), and wherein the respective outermost axial extent (348) of one or more converging airflow guides (312) of the plurality of converging airflow guides (312) is at least substantially the same as the respective outermost axial extent (348) of one or more diverging airflow guides (314) of the plurality of diverging airflow guides (314).

C13. The airflow interleaver (300) of any of paragraphs C1-C12, wherein the airflow interleaver (300) comprises a spin-inducing conformation (346) that is configured to induce spin in the mixed airflow (112).

C13.1. The airflow interleaver (300) of paragraph C13, wherein each converging airflow guide (312) of the plurality of converging airflow guides (312) extends along and defines a converging airflow guide radial axis (324) that is curved in an azimuthal direction.

C13.2. The airflow interleaver (300) of any of paragraphs C13-C13.1, wherein each diverging airflow guide (314) of the plurality diverging airflow guides (314) extends along and defines a diverging airflow guide radial axis (326) that is curved in an azimuthal direction.

C13.3. The airflow interleaver (300) of any of paragraphs C13-C13.2, wherein each converging airflow guide (312) of the plurality of converging airflow guides (312) is tilted relative to a plane perpendicular to the interleaver axis (310).

C13.4. The airflow interleaver (300) of any of paragraphs C13-C13.3, wherein each diverging airflow guide (314) of the plurality of diverging airflow guides (314) is tilted relative to a plane perpendicular to the interleaver axis (310).

D1. A method (500) of controlling a temperature of a cabin (30) of an aircraft (12), the method (500) comprising:
    channeling (505) a first airflow (104) from the cabin (30) of the aircraft (12) to a mix manifold (200);
    channeling (510) a second airflow (108) from an air cycle machine (16) to the mix manifold (200); and
    mixing (515), with an airflow interleaver (300) positioned within a mixing chamber (202) of the mix manifold (200), the first airflow (104) with the second airflow (108) to produce a mixed airflow (112),
    wherein the mixing (515) comprises:
    guiding (520), with the airflow interleaver (300), the first airflow (104) away from a central axis (226) of the mixing chamber (202); and
    guiding (525), with the airflow interleaver (300), the second airflow (108) towards the central axis (226) of the mixing chamber (202).

D2. The method (500) of paragraph D1, wherein the mixing (515) further comprises:
    partitioning (530), with the airflow interleaver (300), the first airflow (104) into a plurality of first airflow streams;
    partitioning (530), with the airflow interleaver (300), the second airflow (108) into a plurality of second airflow streams; and
    interleaving (535), with the airflow interleaver (300), the plurality first airflow streams with the plurality of second airflow streams to produce the mixed airflow (112).

D3. The method (500) of any of paragraphs D1-D2, wherein the airflow interleaver (300) is a first airflow interleaver (300) of a plurality of airflow interleavers (300), wherein the plurality of airflow interleavers (300) further includes a second airflow interleaver (300), and wherein the method (500) further comprises:
    channeling the mixed airflow (112) to the second airflow interleaver (300);
    channeling a trim airflow (38) to the second airflow interleaver (300); and
    mixing (550), with the second airflow interleaver (300), the mixed airflow (112) with the trim airflow (38) to produce a cabin airflow (44), wherein the mixing (550) the mixed airflow (112) with the trim airflow (38) comprises:
    guiding, with the airflow interleaver (300), the trim airflow (38) away from an interleaver axis (310) of second airflow interleaver (300); and
    guiding, with the airflow interleaver (300), the mixed airflow (112) towards the interleaver axis (310) of second airflow interleaver (300).

D3.1 The method (500) of paragraph D3, wherein the mixing (550) further comprises:
    partitioning, with the second airflow interleaver (300), the mixed airflow (112) into a plurality of mixed airflow streams;
    partitioning, with the second airflow interleaver (300), the trim airflow (38) into a plurality of trim airflow streams; and
    interleaving, with the second airflow interleaver (300), the plurality mixed airflow streams with the plurality of trim airflow streams to produce the cabin airflow (44).

D3.2. The method (500) of any of paragraphs D1-D3.1, further comprising:
    detecting a temperature of the cabin airflow (44); and
    regulating (555) a flow rate of the trim airflow (38) into the mixed airflow (112),
    wherein the regulating (555) includes:
    increasing a flow rate of the trim airflow (38) into the mixed airflow (112) when the temperature of the cabin airflow (44) is less than a threshold minimum of a target cabin airflow temperature range; and
    decreasing a flow rate of the trim airflow (38) into the mixed airflow (112) when the temperature of the cabin airflow (44) is greater than a threshold maximum of the target cabin airflow temperature range.

D3.2.1. The method (500) of paragraph D3.2, wherein a temperature of the trim airflow (38) is greater than a temperature of the mixed airflow (112).

D4. The method (500) of any of paragraphs D1-D3.2.1, further comprising:
    detecting a/the temperature of a/the cabin airflow (44) that includes the mixed airflow (112); and
    regulating (545) a ratio of the first airflow (104) to the second airflow (108) in the mixed airflow (112).

D4.1 The method (500) of paragraph D4, wherein the regulating (545) includes:
    increasing a ratio of a flow rate of the first airflow (104) to a flow rate of the second airflow (108) when the temperature of the cabin airflow (44) is less than a threshold minimum of a/the target cabin airflow temperature range; and
    decreasing the ratio of the flow rate of the first airflow (104) to the flow rate of the second airflow (108) when the temperature of the cabin airflow (44) is greater than a threshold maximum of the target cabin airflow temperature range.

D3.2. The method (500) of paragraph D3, wherein a temperature of the first airflow (104) is greater than a temperature of the second airflow (108).

A controller 60 may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An environmental control system for regulating airflow within an aircraft, the environmental control system comprising:
    a mix manifold comprising a mixing chamber defining a central axis that extends therethrough, wherein the mix manifold is configured to receive a first airflow and a second airflow; and
    an airflow interleaver disposed within the mixing chamber, wherein the airflow interleaver comprises a first airflow guide structure configured to guide the second airflow towards the central axis and a second airflow guide structure configured to guide the first airflow away from the central axis to facilitate mixing of the first airflow and the second airflow to produce a mixed airflow therefrom;
    wherein the airflow interleaver includes a tubular body having an interleaver axis that extends positively in a downstream direction; and
    wherein the tubular body defines a tubular body inner radius, as measured between the interleaver axis and a portion of the tubular body facing the interleaver axis, wherein the first airflow guide structure defines a converging airflow guide innermost radial extent, as measured between the interleaver axis and a point on the first airflow guide structure that is nearest to the interleaver axis, wherein the converging airflow guide innermost radial extent of the first airflow guide structure is less than a converging airflow guide threshold proportion of the tubular body inner radius, and wherein the converging airflow guide threshold proportion is at most 20%.

2. The environmental control system of claim 1, wherein the mix manifold receives the first airflow from a cabin of the aircraft, and wherein the mix manifold receives the second airflow from an air cycle machine of the aircraft.

3. The environmental control system of claim 1, wherein the mixed airflow is supplied to a cabin of the aircraft.

4. The environmental control system of claim 1, further comprising:
    a cabin airflow temperature sensor configured to detect a temperature of a cabin airflow, wherein the cabin airflow comprises the mixed airflow, and
    a controller configured to receive a cabin airflow temperature signal from the cabin airflow temperature sensor that corresponds to the temperature of the cabin airflow,
    wherein the controller is programmed to at least partially control operation of the environmental control system to regulate the temperature of the cabin airflow based, at least in part, on the cabin airflow temperature signal.

5. The environmental control system of claim 1, wherein the airflow interleaver is configured to:
    (i) partition the first airflow into a plurality of first airflow streams;
    (ii) partition the second airflow into a plurality of second airflow streams; and
    (iii) interleave the plurality of first airflow streams with the plurality of second airflow streams to produce the mixed airflow.

6. The environmental control system of claim 1, wherein the airflow interleaver comprises a tubular body that is configured to receive the first airflow, wherein the tubular body extends along and defines an interleaver axis that is aligned with the central axis.

7. The environmental control system of claim 6, wherein the first airflow guide structure comprises a plurality of converging airflow guides that extend from the tubular body radially towards the interleaver axis; and
    wherein the second airflow guide structure comprises a plurality of diverging airflow guides that extend from the tubular body radially away from the interleaver axis.

8. The environmental control system of claim 7, wherein the plurality of converging airflow guides comprises a first subset of converging airflow guides and a second subset of converging airflow guides, and wherein each converging airflow guide of the first subset of converging airflow guides extends closer to the interleaver axis than does each converging airflow guide of the second subset of converging airflow guides.

9. The environmental control system of claim 1, wherein the airflow interleaver is one of a plurality of airflow interleavers, wherein the airflow interleaver is a mix manifold airflow interleaver wherein the plurality of airflow interleavers further comprises a cabin airflow interleaver disposed within a duct of a mixed airflow ducting that is configured to channel the mixed airflow and defines a ducting central axis extending therethrough, wherein the cabin airflow interleaver is positioned within the mixed airflow ducting at an intersection with a cabin trim airflow supply duct that is configured to channel a trim airflow into the mixed airflow, wherein the first airflow guide structure of the cabin airflow interleaver is configured to guide the mixed airflow towards the ducting central axis and the second airflow guide structure is configured to guide the trim airflow away from the ducting central axis to facilitate mixing of the mixed airflow with the trim airflow to produce a cabin airflow.

10. The environmental control system of claim 1, wherein the airflow interleaver comprises:
  a plurality of converging airflow guides that extend from the tubular body radially towards the interleaver axis; and
  a plurality of diverging airflow guides that extend from the tubular body radially away from the interleaver axis; and
  wherein the plurality of converging airflow guides are azimuthally interleaved with the plurality of diverging airflow guides, and wherein the plurality of converging airflow guides and the plurality of diverging airflow guides collectively are configured to interleave a plurality of first airflow streams flowing from the tubular body in the downstream direction with a plurality of second airflow streams flowing from a region external to the tubular body in the downstream direction to produce a mixed airflow therefrom.

11. The environmental control system of claim 10, wherein the plurality of converging airflow guides comprises a first subset of converging airflow guides and a second subset of converging airflow guides, and wherein each converging airflow guide of the first subset extends closer to the interleaver axis than does each converging airflow guide of the second subset.

12. The environmental control system of claim 10, further comprising an undulating wall, wherein the undulating wall forms each converging airflow guide of the plurality of converging airflow guides and each diverging airflow guide of the plurality of diverging airflow guides.

13. The environmental control system of claim 10, wherein the plurality of converging airflow guides define a plurality of inter-guide voids, and wherein each inter-guide void of the plurality of inter-guide voids extends between and separates a corresponding pair of converging airflow guides of the plurality of converging airflow guides.

14. The environmental control system of claim 10, wherein each converging airflow guide of the plurality of converging airflow guides extends along and defines a respective converging airflow guide radial axis, and wherein each converging airflow guide of the plurality of converging airflow guides defines a respective converging airflow channel that extends along the respective converging airflow guide radial axis and is configured to guide at least a portion of one or more second airflow streams of the plurality of second airflow streams towards the interleaver axis.

15. The environmental control system of claim 10, wherein each diverging airflow guide of the plurality of diverging airflow guides extends along and defines a respective diverging airflow guide radial axis, and wherein each diverging airflow guide of the plurality of diverging airflow guides defines a respective diverging airflow channel that extends along the respective diverging airflow guide radial axis and is configured to guide at least a portion of one or more first airflow streams of the plurality of first airflow streams away from the interleaver axis.

16. A method of controlling a temperature of a cabin of an aircraft utilizing the environmental control system of claim 1, the method comprising:
  channeling the first airflow from the cabin of the aircraft to the mix manifold;
  channeling the second airflow from an air cycle machine to the mix manifold; and
  mixing, with the airflow interleaver positioned within the mixing chamber of the mix manifold, the first airflow with the second airflow to produce the mixed airflow having a linear flow pattern, wherein the mixing comprises:
    guiding, with the airflow interleaver, the first airflow away from the central axis of the mixing chamber; and
    guiding, with the airflow interleaver, the second airflow towards the central axis of the mixing chamber.

17. The method of claim 16, wherein the mixing further comprises:
  partitioning, with the airflow interleaver, the first airflow into a plurality of first airflow streams;
  partitioning, with the airflow interleaver, the second airflow into a plurality of second airflow streams; and
  interleaving, with the airflow interleaver, the plurality of first airflow streams with the plurality of second airflow streams to produce the mixed airflow.

18. The method of claim 16, wherein the airflow interleaver is a first airflow interleaver of a plurality of airflow interleavers, wherein the plurality of airflow interleavers further includes a second airflow interleaver, and wherein the method further comprises:
  channeling the mixed airflow to the second airflow interleaver;
  channeling a trim airflow to the second airflow interleaver; and
  mixing, with the second airflow interleaver, the mixed airflow with the trim airflow to produce a cabin airflow, wherein the mixing the mixed airflow with the trim airflow comprises:
    guiding, with the airflow interleaver, the trim airflow away from an interleaver axis of second airflow interleaver; and
    guiding, with the airflow interleaver, the mixed airflow towards the interleaver axis of second airflow interleaver.

19. The method of claim 18, further comprising:
  detecting a temperature of the cabin airflow; and
  regulating a flow rate of the trim airflow into the mixed airflow,
  wherein the regulating includes:
    increasing a flow rate of the trim airflow into the mixed airflow when the temperature of the cabin airflow is less than a threshold minimum of a target cabin airflow temperature range; and decreasing a flow rate of the trim airflow into the mixed airflow when the temperature of the cabin airflow is greater than a threshold maximum of the target cabin airflow temperature range.

20. The environmental control system of claim 1, wherein the tubular body bounds an open central region that is configured to channel the first airflow, and wherein the interleaver axis extends through the open central region.

\* \* \* \* \*